(12) United States Patent
Jannarone et al.

(10) Patent No.: US 8,069,132 B2
(45) Date of Patent: *Nov. 29, 2011

(54) EFFICIENT PROCESSING IN AN AUTO-ADAPTIVE NETWORK

(75) Inventors: Robert John Jannarone, San Diego, CA (US); John Tyler Tatum, Atlanta, GA (US); Jennifer A. Gibson, Atlanta, GA (US)

(73) Assignee: Brainlike, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/432,514

(22) Filed: Apr. 29, 2009

(65) Prior Publication Data

US 2009/0259615 A1 Oct. 15, 2009

Related U.S. Application Data

(63) Continuation of application No. 11/484,874, filed on Jul. 10, 2006, now Pat. No. 7,529,721.

(60) Provisional application No. 60/697,355, filed on Jul. 8, 2005.

(51) Int. Cl.
*G06F 9/44* (2006.01)

(52) U.S. Cl. .............................. 706/52; 706/14; 706/23

(58) Field of Classification Search .................... 706/52, 706/14, 23
See application file for complete search history.

(56) References Cited

U.S. PATENT DOCUMENTS 5,835,902 A * 11/1998 Jannarone ....................... 706/26
5,966,178 A   10/1999 Tashima et al.
6,928,398 B1 *  8/2005 Fang et al. ....................... 703/2
7,079,626 B2 *  7/2006 Hart et al. ................... 379/1.04
7,529,721 B2    5/2009 Jannarone et al.
2006/0074741 A1  4/2006 Orumchian et al.
2008/0097802 A1  4/2008 Ladde et al.
2008/0126274 A1  5/2008 Jannarone et al.

FOREIGN PATENT DOCUMENTS

JP            03-150916 A         6/1991
(Continued)

OTHER PUBLICATIONS

"Methods for imputation of missing values in air quality data sets", H. Junninen, H. Niska, K. Tuppurainen, J. Ruuskanen, M. Kolehmainen, Atmospheric Environment, vol. 38, Issue 18, Jun. 2004, pp. 2895-2907.*

(Continued)

*Primary Examiner* — Jeffrey A Gaffin
*Assistant Examiner* — Mai T Tran
(74) *Attorney, Agent, or Firm* — Stephen C. Beuerle; Procopio Cory Hargreaves & Savitch LLP

(57) ABSTRACT

Feature values, which may be multi-dimensional, collected over successive time slices, are efficiently processed for use, for example, in known adaptive learning functions and event detection. A Markov chain in a recursive function to calculate imputed values for data points by use of a "nearest neighbor" matrix. Only data for the time slices currently required to perform computations must be stored. Earlier data need not be retained. A data selector, referred to herein for convenience as a window driver, selects successive cells of appropriate adjacent values in one or more dimensions to comprise an estimation set. The window driver effectively indexes tables of data to efficiently deliver input data to the matrix. In one form, feature inputs are divided into subgroups for parallel, pipelined processing.

9 Claims, 25 Drawing Sheets

FOREIGN PATENT DOCUMENTS

JP 06-222809 A 8/1994

OTHER PUBLICATIONS

"Adaptive nearest neighbor search for relevance feedback in large image databases", P. Wu, B. S. Manjunath, International Multimedia Conference; Proceedings of the ninth ACM international conference on Multimedia, vol. 9, 2001, pp. 89-97.*

"Adaptive nearest neighbor search for relevance feedback in large image databases", P. Wu, B. S. Manjunath, Proceeding Multimedia 01 Proceedings of the ninth ACM International conf, Sep. 30-Oct. 5, 2001, pp. 89-97.*

International Search Report and Written Opinion for PCT/US06/27006 issued May 8, 2007.

McBader et al., A Programmable Image Signal Processing Architecture for Embedded Vision Systems, Proc. 14th IEEE International Conference on Digital Signal Processing, DSP 2002, Jul. 3, 2002, pp. 1269-1272.

Sun, Motion Activity for Video Indexing, Ph.D. Thesis, University of California, Santa Barbara, Jun. 2004, entire document, especially fig 5-1, p. 92.

International Search Report and Written Opinion for PCT/US2008/064276 issued Dec. 18, 2008.

Gao et al., Evaluating Continuous Nearest Neighbor Queries for Streaming Time Series via Pre-fetching, 2002, CIKM, Nov. 4-9, 2002 pp. 485-492.

U.S. Appl. No. 12/412,680, filed Mar. 27, 2009, Jannarrone et al.

European Search Report from EP 06786982.6 dated Apr. 14, 2010, 7 pages.

Ankur Jain, Edward Y. Chang, Yuang-Fang Wang: "Adaptive Stream Resource Management Using Kalman Filters" SIGMOD 2004, Jun. 18, 2004, 12 pages.

Eiman Elnahrawy et al.: "Context-Aware Sensors", Jan. 14, 2004, 17 pages.

Andrew Kachites McCallum: "Reinforcement Learning with Selective Perception and Hidden State", Dec. 31, 1996, 156 pages.

* cited by examiner

| Rapper input time slice: | Input stage Rapper input (and step 2 output) time slice | screener feature input (and step 2 output) time slice | screener kernel time slice input (and step 2 output) time slice | correlator feature time slice input (and step 2 output) time slice | correlator kernel time slice input (and step 2 forecaster output) time slice | forecaster input time slice | forecaster step 2 output forecast time slice | output processor time slice input |
|---|---|---|---|---|---|---|---|---|
| 1 | 1 | | | | | | | |
| 2 | 2 | 1 | | | | | | |
| 3 | 3 | 2 | 1 | | | | | |
| 4 | 4 | 3 | 2 | 1 | | | | |
| 5 | 5 | 4 | 3 | 2 | 1 | | | |
| 6 | 6 | 5 | 4 | 3 | 2 | 1 | | |
| 7 | 7 | 6 | 5 | 4 | 3 | 2 | 1 | |
| 8 | 8 | 7 | 6 | 5 | 4 | 3 | 2 | 1 |
| 9 | 9 | 8 | 7 | 6 | 5 | 4 | 3 | 2 |
| 10 | 10 | 9 | 8 | 7 | 6 | 5 | 4 | 3 |
| • | • | • | • | • | • | • | • | • |
| • | • | • | • | • | • | • | • | • |
| • | • | • | • | • | • | • | • | • |

Fig. 11

Features vs. Time with No Space Dimensions (only one window):

DEPENDENT CELLS: | D |

INDEPENDENT CELLS: | I |

FRAME CELLS: | F |

| | | | |
|---|---|---|---|
| Input features per cell, n_features_in_per_cell: | 8 | | |
| Window time slices, n_window_time_slices: | 3 | | |
| Model space slices, n_model_space_slices: | 1 | 1 | 1 |
| Window space slices, n_window_space_slices: | 1 | 1 | 1 |
| Frame size: | 0 | 0 | 0 |

Feature Slices:

| | | 0 | 1 | 2 | 3 | 4 | 5 | 6 | 7 |
|---|---|---|---|---|---|---|---|---|---|
| | Now-2 | I | I | I | I | I | I | I | I |
| Time Slices: | Now-1 | I | I | I | I | I | I | I | I |
| | Now | D | D | D | D | D | D | D | D |

Fig. 13

One Space Dimension vs. Time:

DEPENDENT CELLS: [D]

INDEPENDENT CELLS: [I]

FRAME CELLS: [F]

FIRST WINDOW CELLS: ☐

MIDDLE WINDOW CELLS: ☐

LAST WINDOW CELLS: ■

Input features per cell, n_features_in_per_cell: 1
Window time slices, n_window_time_slices: 3
Model space slices, n_model_space_slices: 14 1 1
Window space slices, n_window_space_slices: 3 1 1
Frame size: 1 0 0

Dimension 1 Slices:

| | 0 | 1 | 2 | 3 | 4 | 5 | 6 | 7 | 8 | 9 | 10 | 11 | 12 | 13 | F |
|---|---|---|---|---|---|---|---|---|---|---|---|---|---|---|---|
| | F | | | | | | | | | | | | | | |

Time Slices:

| | | | | | | | | | | | | | | | |
|---|---|---|---|---|---|---|---|---|---|---|---|---|---|---|---|
| Now-2 | F | I | | | I | I | I | I | | | | | I | I | F |
| Now-1 | F | I | | | I | I | I | I | | | | | I | I | F |
| Now | F | I | D | | I | I | D | I | | | | | I | D | F |

Fig. 14

Two Space Dimensions:

DEPENDENT CELLS: [D]  FIRST WINDOW CELLS: [ ]

INDEPENDENT CELLS: [I]  MIDDLE WINDOW CELLS: [ ]

FRAME CELLS: [F]  LAST WINDOW CELLS: [■]

| | |
|---|---|
| Input features per cell, n_features_in_per_cell: | 1 |
| Window time slices, n_window_time_slices: | 1 |
| Model space slices, n_model_space_slices: | 3, 14 |
| Window space slices, n_window_space_slices: | 3, 3, 1 |
| Frame size: | 1, 1, 0 |

Dimension 2 Slices:

| | F | 0 | 1 | 2 | 3 | 4 | 5 | 6 | 7 | 8 | 9 | 10 | 11 | 12 | 13 | F |
|---|---|---|---|---|---|---|---|---|---|---|---|---|---|---|---|---|
| F | F | F | F | F | F | F | F | F | F | F | F | F | F | F | F | F |
| 0 | F | D | I | | | | | D | I | | | | | I | D | F |
| 1 | F | I | | | | | I | I | I | | | | | I | I | F |
| 2 | F | F | F | F | F | F | F | F | F | F | F | F | F | F | F | F |

Dim. 1 Slices:

Fig. 15

Two Space Dimensions vs. Time:

DEPENDENT CELLS: D  FIRST WINDOW CELLS: ☐

INDEPENDENT CELLS: I  MIDDLE WINDOW CELLS: ☐

FRAME CELLS: F  LAST WINDOW CELLS: ■

Input features per cell, n_features_in_per_cell: 1
Window time slices, n_window_time_slices: 3
Model space slices, n_model_space_slices: 7   14   1
Window space slices, n_window_space_slices: 5   3   1
Frame size: 2   1   0

Now−2 (t−2) time slice :
Dim. 2 Slices:

| | | 0 | 1 | 2 | 3 | 4 | 5 | 6 | 7 | 8 | 9 | 10 | 11 | 12 | 13 | |
|---|---|---|---|---|---|---|---|---|---|---|---|---|---|---|---|---|
| | F | F | F | F | F | F | F | F | F | F | F | F | F | F | F |
| F | F | | | | | | | | | | | | | | | F |
| 0 | F | | I | I | I | I | | | | | | | | | | F |
| 1 | F | | I | I | I | I | | | | | | | | | | F |
| 2 | F | | I | I | I | I | | | | | | | | | | F |
| 3 | F | | | | | | I | I | I | | | | | | | F |
| 4 | F | | | | | | I | I | I | | | | ■ | ■ | ■ | F |
| 5 | F | | | | | | I | I | I | | | | ■ | ■ | ■ | F |
| 6 | F | | | | | | | | | | | | ■ | ■ | ■ | F |
| F | F | | | | | | | | | | | | | | | F |
| | F | F | F | F | F | F | F | F | F | F | F | F | F | F | F |

Dim. 1 Slices:

Fig. 16 part 1 of 2

Fig. 16 part 2 of 2

Three Space Dimensions:

DEPENDENT CELLS: ☐D  FIRST WINDOW CELLS: ☐

INDEPENDENT CELLS: ☐I  MIDDLE WINDOW CELLS: ▨

FRAME CELLS: ☐F  LAST WINDOW CELLS: ■

| | | |
|---|---|---|
| Input features per cell, n_features_in_per_cell: | 1 | |
| Window time slices, n_window_time_slices: | 3 | |
| Model space slices, n_model_space_slices: | 7 | 14 | 11 |
| Window space slices, n_window_space_slices: | 5 | 3 | 3 |
| Frame size: | 2 | 1 | 1 |

FIRST WINDOW:

Dim. 3 slice -1 (Frame):
Dim. 2 Slices:

| a | F | 0 | 1 | 2 | 3 | 4 | 5 | 6 | 7 | 8 | 9 | 10 | 11 | 12 | 13 | F |
|---|---|---|---|---|---|---|---|---|---|---|---|---|---|---|---|---|
| F | F | F | F | F | F | F | F | F | F | F | F | F | F | F | F | F |
| F | F | F | F | F | F | F | F | F | F | F | F | F | F | F | F | F |
| 0 | F | F | F | F | F | F | F | F | F | F | F | F | F | F | F | F |
| 1 | F | F | F | F | F | F | F | F | F | F | F | F | F | F | F | F |
| 2 | F | F | F | F | F | F | F | F | F | F | F | F | F | F | F | F |
| 3 | F | F | F | F | F | F | F | F | F | F | F | F | F | F | F | F |
| 4 | F | F | F | F | F | F | F | F | F | F | F | F | F | F | F | F |
| 5 | F | F | F | F | F | F | F | F | F | F | F | F | F | F | F | F |
| 6 | F | F | F | F | F | F | F | F | F | F | F | F | F | F | F | F |
| F | F | F | F | F | F | F | F | F | F | F | F | F | F | F | F | F |
| F | F | F | F | F | F | F | F | F | F | F | F | F | F | F | F | F |

Dim. 1 Slices:

Fig. 17 part 1 of 5

Fig. 17 part 2 of 5

Fig. 17 part 3 of 5

Fig. 17 part 4 of 5

Fig. 17 part 5 of 5

Attorney Docket No. 115463-001CT1　　　　　　　　Application No. 12/432,514

Replacement Drawing Sheet

EFFICIENT PROCESSING IN AN AUTO-ADAPTIVE NETWORK

CROSS REFERENCE TO RELATED APPLICATIONS

The present application is a continuation of U.S. patent application Ser. No. 11/484,874, filed Jul. 10, 2006, which claims the benefit of provisional patent application No. 60/697,355 filed on Jul. 8, 2005. All of these applications are incorporated by reference herein as though set forth in full.

FIELD OF THE INVENTION

The present subject matter relates generally to machine learning and more specifically to efficient processing of parameter values, which may be multidimensional, for use in calculating, predicting and imputing values for a range of applications providing' auto-adaptive functions.

BACKGROUND OF THE INVENTION

Auto-adaptive systems have many applications. These applications include event recognition based on data measured over a number of successive time periods. Events take many different forms. For example, events may include detection of a target in a particular area, sensing of an out-of specification condition in a physical process environment or correspondence of processed psychometric measurements with a particular behavior prediction profile. Anomaly sensing is often an element of detecting an event. Event recognition may also comprise evaluation of sensed data to recognize or reject existence of conditions indicated by the data or to initiate a particular action.

One use of event detection is in military operations. When making critical combat decisions, a commander must often decide to either act at once or hold off and get more information. Immediate action may offer tactical advantages and improve success prospects, but it could also lead to heavy losses. Getting more data may improve situational awareness and avoid heavy losses, but resulting delays may cause other problems. Making the right choice depends strongly on knowing how much could be gained from gathering more information, and how much could be lost by delaying action. Advantages that can be achieved through the use of event detection go beyond mere friend or foe identification. A data-based, decisive inference process can help the commander to see how the operational picture might change with the arrival of more data. Seeing what to expect, in turn, will help decide if getting more information is worthwhile or whether an action should be launched at once.

Data is collected by sensors of one kind or another. In the context of the present description, a sensor is an item that provides information that may be used to produce a meaningful result. Data is collected over successive time periods, generally from an array of sensors. Depending on the conditions being analyzed and the type of sensors utilized, different types of data points may be established. For example, a data point characterizing a position of a point in a plane may be characterized by x and y coordinates. Such a point has two spatial dimensions. Other dimensions may also exist. For example, if the data point describes the condition of a pixel in a television display, the data point may be further characterized by values of luminance and chroma. These values are characterized as further dimensions of a data point.

In order to describe an environment mathematically, event recognition adaptive algorithms process successive signals in one or a plurality of dimensions to converge on a model of the background environment to maintain track of the background's dynamic change. Systems employing such algorithms are referred to as machine learning in that they are capable of learning. When an event occurs within a sensor's area of response, e.g., within a field of view of optical sensors, the adaptive algorithms determine if the return is sufficiently different from the background prediction. Domain specific event identification algorithms may then be applied to verify if an event has occurred in order to minimize the likelihood and number of false positives. An important aspect of the adaptive algorithm approach is a dynamic detection threshold that could enable these systems to find signals and events that could be lost in noise were they to be compared to fixed thresholds. Having a dynamic threshold also allows a system to maintain a tighter range on alarm limits. Broader alarm ranges decrease the ability of the system to distinguish anomalous conditions from normal conditions. Machine learning is also • readily embodied in parallel configurations to allow for extra speed afforded by parallel processing.

U.S. Pat. No. 5,835,902 discloses a system for learning from and responding to regularly arriving information at once by quickly combining prior information with concurrent trial information to produce useful learned information. Predicted values are generated, and an anomaly is indicated if a current measurement is sufficiently divergent from an expected measurement. In one form, a processing system for computing output values from input values received during a time trial comprises a processing unit receiving sequential input data values from an input vector. In order to generate the estimated values, a connection weight matrix is calculated that is the inverse of a sample covariance matrix at the beginning of the time period and the inverse of the updated sample covariance matrix at the end of the time period. While this system is effective, it has physical limitations.

To use such a system for nominal video image of 500,000 pixels, the matrix to be computed would have a size of 500,000×500,000. This is too large a number to be processed in real time by stand-alone processor circuits that are capable of inclusion on a circuit board in a remotely controlled device. Even as to tractable applications, the processor has significant minimum requirements in terms of complexity, required silicon "real estate" and operating power. Such requirements are relatively easily met when a processor is contained in a base unit such as a ship. However, tactically, there are scenarios in which it is highly desirable to use a portable device such as an unmanned underwater vehicle (UUV) to gather information and make decisions. Such devices have such limited, self powered electrical power sources that power demand becomes a critical factor. Weight and space limitations are significant in many forms of portable devices. It is desirable to provide a system better suited to operation in a remote, space limited and self powered unit.

U.S. Pat. No. 6,327,677 discloses a processor to generate values to which current values are compared. However the processor uses historical samples for comparison to currently measured values continuously on a time slice by time slice basis.

Other complex event detection systems have known drawbacks. A complex process requires powerful processors rather than simpler, less expensive field programmable gating arrays (FPGAs). FPGAs have not been used for processing of multidimensional measurements. Many systems use C++ programming, which is effective but slow in comparison to the simple instructions used for FPGAs. It is desirable to provide a processor arrangement for event detection which is simple, efficient in terms of power requirements, fast and comparatively low cost in relation to prior powerful event detection systems. It is useful to provide the capability of parallel processing in order to speed production of results.

However, as new unmanned vehicles are being developed that are smaller, more agile, and have the capability of reaching places that have not been reached before, the demands made upon the data processing capabilities of these systems have increased dramatically. An article in COTS *Journal*, January 2006, http://www.cotsjournalalonline.com/home/article.php?id=100450, noted that, "The military's transformation into a more nimble and information aware fighting force means that high-demand, • compute-intensive military systems need huge amounts of processing power in a small space. Multicore processors are leading the way. . . . On the silicon side, the move to multicore processors is being driven by the limitations of single-core PUs in these high demand systems. Unmanned aerial vehicle (UAV) image recognition and collision detection processing, for example, requires many DSPs or general—purpose processors, or a combination of both. Pushing single-core processors any further in performance can't be done without drastic consequences in the heat produced and the power consumed."

Single core processors include such devices as high-powered AMD and Intel processors. Dual core processors represent new and more expensive designs for which the new architectures and programming need to be created. An example of a dual core processor is the new Intel Pentium D dual core processor. If designs can be found that can utilize older and simpler processors to perform functions such as those performed by UAVs, much redesign and power consumption can be avoided. Low level software can be utilized. Reliability will be increased and time to deployment from formulation of specifications is significantly decreased.

It is also important to formulate efficient ways of handling large arrays of data. In many typical applications, the UAV-borne processor will need to respond to outputs from a large array of sensors. The sensors will be producing consecutive outputs at a high frequency. The above-cited U.S. Pat. No. 5,835,902 successfully processes data. However, values are updated by processing the inverse of a covariance matrix. This is a complex calculation, especially when the number of covariates is large.

In order to evaluate data, it is important to provide efficient ways of presenting data to a processor. U.S. Pat. No. 6,985,779 discloses a system in which sensor output data is organized within a spreadsheet in which one column represents an output of one sensor and in which each role of the columns represents the output during a successive frequency period, or time slice. This patent does not disclose efficiently processing the values in a matrix to define imputed values.

Many prior art arrangements perform calculations for event detection and adaptive learning after entire sets of data have been collected. Often data collected by a remote vehicle must be processed at a home base. Prior arrangements have not provided for maximizing data reduction in the remote vehicle.

SUMMARY OF THE INVENTION

Briefly stated, in accordance with embodiments of the present invention, efficient processing of feature values, which may be multi-dimensional, collected over successive time slices, is provided. Processing results are used, for example, in known functions for calculating, predicting and imputing values, updating learned functions, assigning plausibility to measurements, discerning deviance between measured and expected values and event detection. A spatially stationary Markov chain model is used for inferring expected values, preferably by calculating imputed values for data points by use of a "nearest neighbor" matrix. A recursive function is used to generate imputed values. The recursive function utilizes values obtained or calculated during previous time slices. Only data for the time slices currently required to perform computations must be stored. Earlier data need not be retained. During a current time slice, a data selector, referred to herein for convenience as a window driver, selects appropriate adjacent locations in at least one dimension to a dependent data location whose value is to be imputed The set of locations is an estimation set. The window driver effectively indexes through data to select estimation sets for successive dependent data points. Sets of locations corresponding to locations in each estimation set are also selected for each of a number of previous time slices. An imputed value is generated for the dependent data point in accordance with an estimation function based on the values in the selected sets. pin In typical applications, many inputs will be provided in each time slice. In one instance, 512 numbers may be provided. One or more functions of each number may be generated for further processing. In one form, the inputs are divided into subgroups, e.g., 512 inputs may be divided into eight subgroups of 64 inputs. Each subgroup is processed respectively in one of a plurality off parallel, pipelined logic units. Division of processing tasks into subgroups facilitates use of relatively simple processing hardware in each parallel unit, such as a field programmable gating array rather than a full-fledged processor. The modules are field programmable to allow for flexibility in selection of data to be processed and algorithms to be utilized and to provide for the ability to simulate software programming of selected routines.

BRIEF DESCRIPTION OF THE DRAWINGS

The present subject matter may be further understood by reference to the following description taken in connection with the following drawings.

FIG. 11 is a chart illustrating values from various time slices during a current selected time slice t0;

FIGS. 13-17 are each a chart useful in illustrating selection of members of sets of data, called estimation sets, to be used in successive calculations of a recursive function

DETAILED DESCRIPTION

Embodiments of the present invention provide for operation referred to as adaptive processing. Auto-adaptive processing is not a recognized term of art, but is descriptive of processing of data, often condition-responsive data received from an array of sensors received in successive time slices, in order to update adaptive functions and to calculate imputed values of data for use in evaluating data and which may also be used to predict data. Time slices may also be referred to by such terms as clock periods, time trials or data cycles. For each time slice, measurement values and measurement plausibility values are supplied to the system, and a learning weight is either supplied to or generated by the system.

Auto-adaptive processing operations may include converting measurement values to feature values; converting measurement plausibility values to feature viability values; using each viability value to determine missing value status of each feature value; using non-missing feature values to update parameter learning; imputing each missing feature value from non-missing feature values and/or prior learning; converting imputed feature values to output imputed measurement values; and supplying a variety of feature value and feature function monitoring and interpretation statistics.

The above functions are used by applying mathematical functions to selected data entries in a data array. Embodiments of the present invention utilize a "windowing" function in order to "index" through the data array to select successive groups of data entries for processing. Field programmable windowed functionality can be applied to many applications by programming the data entries to be utilized for a calculation and to set parameters of algorithms.

Embodiments of the present invention in one form provide for the option of embodying an auto-adaptive processor in the form of parallel, pipelined adaptive feature processor modules perform operations concurrently. Tasks including, function monitoring, interpretation and refinement operations are done in parallel. Distribution of tasks into modules permits the use of simplified hardware such as field programmable gating arrays (FPGAs), as opposed to full processors in various stages. Auto-adaptive processing may be utilized for tasks that were previously considered to be intractable in real time on hardware of the type used in low powered, portable processors. The option of modular pipelined operation simplifies programming; design and packaging and allows for use of FPGAs in place of high-powered processors. Spatially stationary learned parameter usage, based on assuming that within any window the same estimation functions and learned parameter values, can be used to produce the estimates that in turn allow unexpected events to be detected more efficiently.

Figure 1:
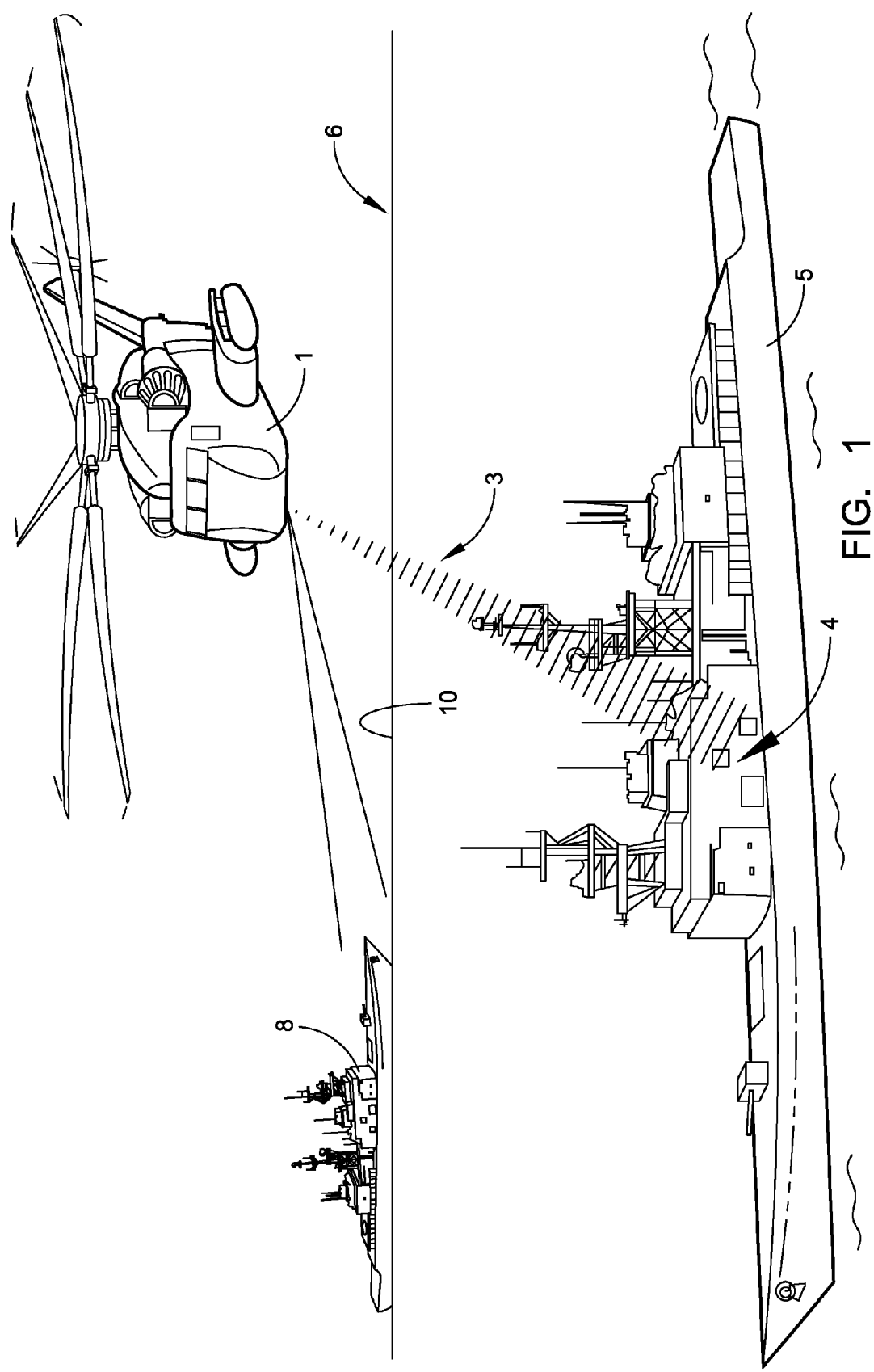
FIG. 1 is an illustration of a UAV employing an embodiment of the present invention gathering data and transmitting intelligence to a command and control station.

Embodiments of the present invention may be used in a very wide variety of applications. These applications include monitoring system performance to prevent breakdowns, disease surveillance and control, military attack prevention, measuring efficacy of antibiotics, detecting unanticipated computer network activity and equipment condition monitoring. Event recognition may be used to trigger an alarm and initiate a response or produce a wide variety of other reactive or proactive responses. In one application, usability of data is evaluated so that a remote device may decide whether or not to utilize its limited power and bandwidth to transmit data, and substantial data compression is achieved by transmitting only locations of pixels where and when anomalies have been detected One of the many applications for systems including an embodiment of the present invention is illustrated in FIG. 1. In this illustration, a UAV 1 is part of an intelligence system. The UAV 1 comprises an array of sensors, processors and a transmitter, further described and illustrated below. The UAV 1 provides video information via a radio frequency link 3 to a command and control station 4. In the present illustration, the command and control station 4 is housed in a ship 5. The ship 5 is traveling in an ocean 6. The UAV 1 may detect enemy craft 8. The enemy craft 8 may be beyond a horizon 10 of the ship 5. The transmitter within the UAV 1 must have sufficient bandwidth to provide detected video information to the command and control station 4. Data processing equipment and transmitter modulation circuitry must have sufficient capacity to transmit video information. Ideally, all video information provided from the UAV 1 to the base station 4 will be useful. To the extent that the base station 4 will be receiving non-useful information, the base station 4 will have to expend resources to call the non-useful information. Processing of non-useful information at the base station 4 will also slow the response to useful information.

Ambient conditions will have a tendency to obscure the view of the enemy craft 8 from the UAV 1. Moisture in the air is a common ambient condition. Very often, moisture in the air will not be sufficient to block obtaining a useful image. Optical filtering may also be used to reduce haze. However, clouds or rainstorms may be located between the enemy craft 8 and the UAV 1. The video data obtained when the enemy craft 8 are not viewable is referred to in the present description as non-useful information. Commonly, UAVs simply collect data and transmit the data to a command and control station. The UAV 1 must be provided with sufficient resources to transmit non-useful information. In accordance with embodiments of the present invention, data processing is done to determine whether information will be useful or not. One criterion that need be utilized to determine whether information is useful is a contrast level in an image sensed by the UAV 1. An image of cloud cover will have low contrast, while a useful image of the enemy craft 8 will include objects that have contrast with respect to their backgrounds. By preventing transmission of non-useful information, circuitry in the UAV 1 may be designed to have lower bandwidth and power requirements then a circuit which must also transmit non-useful information. The decision whether or not to transmit may be made with respect to individual pixels or with respect to entire image frames, depending on programming selected by a user. Capacity of transmission of useful information and speed of transmission is increased. The resulting decrease in total transmission of information permits the use of simpler circuitry and lowers power requirements. The efficiency and reliability of processing at the command and control station 4 is also increased.

The present system comprises a rapid learning system. A rapid learning system performs auto-adaptive learning continuously, as sensor input values are received in real time. Additionally, the rapid learning system monitors, forecasts or controls data in real-time. The present specification is described in the context of the art of machine learning and adaptive systems. There is a wide range of literature further describing the basis for mathematics utilized here in the construction and performance of learning systems. Further background will be provided by R. J. Jannarone, *Concurrent Learning and Information Processing*, Chapman & Hall, New York, 1997.

Figure 2:
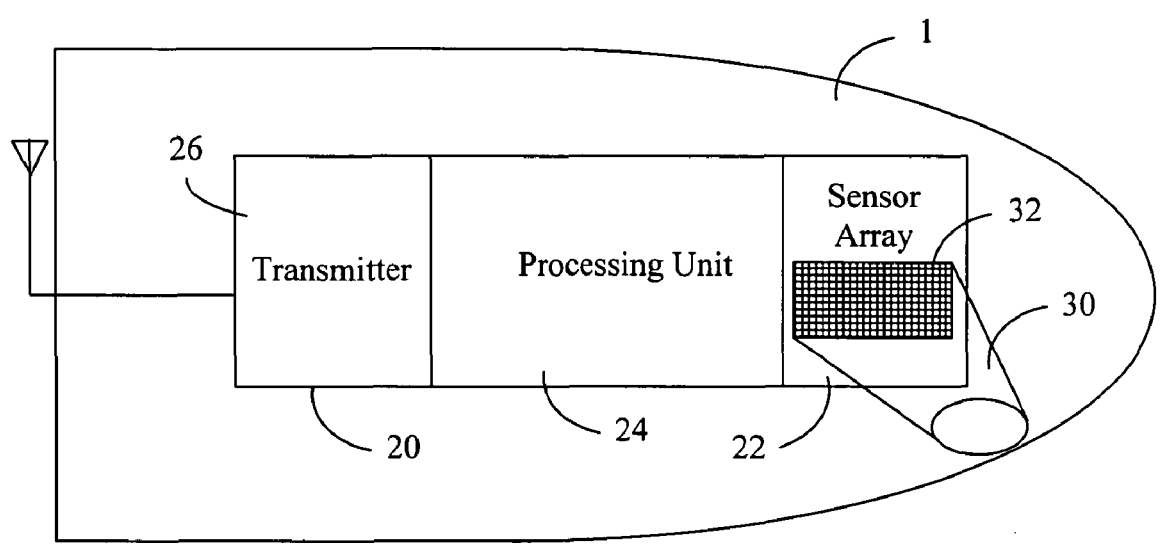
FIG. 2 is a block diagram of a system incorporating an embodiment of the present invention.

A general block diagram of the system incorporating an embodiment of the present invention is shown in FIG. 2. The UAV 1 comprises an electronics unit 20 including a sensor array 22, a processing unit 24 and a transmitter 26. In the present illustration, the sensor array 22 comprises a video camera 30 having an array of pixels 32, each providing an output indicative of light focused on the pixel 32. The present embodiments may process measurements that are one-dimensional or multi-dimensional. A one-dimensional output could comprise a gray-scale level wherein a single value is indicative of pixel output. Alternatively, a plurality of values may represent output of one pixel, such as gray-scale level and color levels. The sensor array 22 provides data to the processing unit 24. The processing unit 24 provides video output to the transmitter 26.

The present embodiments will achieve the necessary functions to produce meaningful output data as in the prior art. However, as further described below, the present embodiments will have a greater generality, efficiency, and affordability as compared to prior art in embodiments. Since speed and capacity of the system are vastly improved with respect to the prior art, a depth of processing is made available in applications where it could not be used before, for example, real-time video processing of entire rasters at many frames per second. New market segments for adaptive processing are enabled.

Data is gathered in successive time slices. The greater the temporal resolution of the data gathering, the shorter the period of each time slice will be. In order to provide for auto-adaptive processing, data received from each of a plurality of sensors during successive time slices will be processed. The functions performed by the present embodiments include receiving input values in consecutive time slices and performing processing operations during each time slice. These operations may include estimating each input value from current and prior input values; comparing each estimated value to its actual value to determine whether or not the actual value is deviant; replacing deviant or missing input, values with their estimated values as appropriate; and updating learned parameters. Updating all learned parameters is important, because it allows event recognition criteria to be continuously, automatically, and adaptively updated over time.

Figure 3:
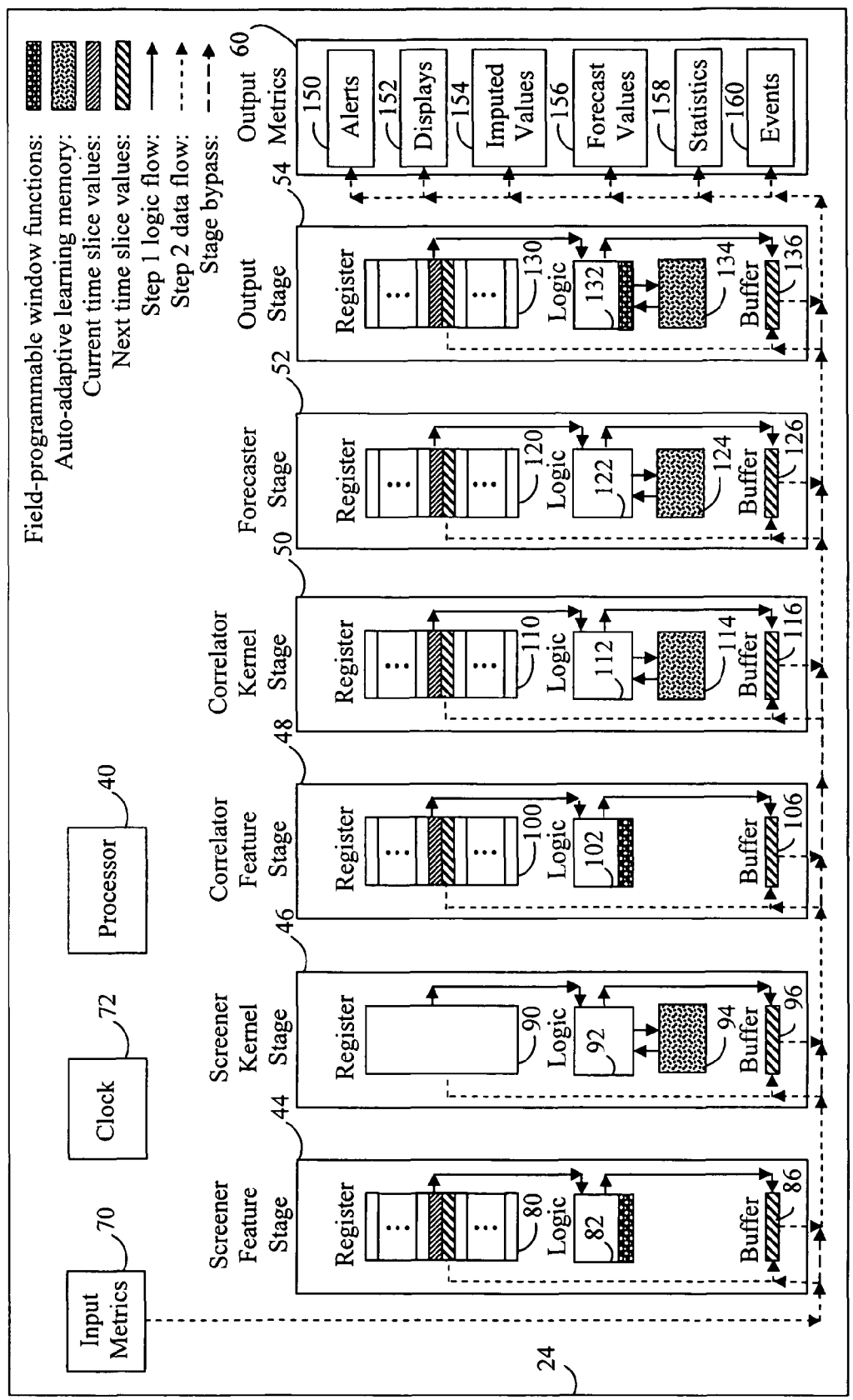
FIG. 3 is a block diagram of one form of processing unit included in the embodiment of FIG. 2.

FIG. 3 is a block diagram of the processing unit 24. FIG. 3 represents one architecture which would be suitable for use. However, items which are represented as discrete elements could be embodied in single chips. Also, items which are represented as a single box may have the various elements of their functionality embodied in separate modules. The processing unit 24 comprises a processing unit (PU) 40. The PU 40 is programmed to perform a number of different, related operations, including coordinating operation of modules described below.

In one preferred form, the separate operations to achieve necessary processing functions as further described below are each performed by a respective module. This modular approach allows construction of each processing stage from a simplified complement. For example, the modules described below in the processing unit 24 may be embodied with field-programmable gating arrays (FPGAs). The use of a simplified architecture facilitates simplified programming and rapid configuration for a selected application. Speed that will enable the processing unit 24 to provide new functionality is provided along with improved interaction of system components to produce a correlation matrix efficiently, as further described below with respect to the correlator kernel module 50 (FIG. 3).

The processing unit 24 processes input data to provide known forms of statistical functions. Embodiments of the present invention facilitate real time generation of statistical functions by the processing unit 24. Processing of large sets of data that have previously been intractable in the environment of a self-powered remote vehicle is also facilitated. The processing unit 24 may include functionality to provide selected statistical calculations. The inclusion of a particular module in the processing unit 24 is optional. The requirements for types of modules to be included in the processing unit 24 are a function of the application in which the system is employed. The particular modules included in the present illustration comprise a screener feature module 44, a screener kernel module 46, a correlator feature module 48, a correlator kernel module 50, a forecaster module 52 and an output module 54. The operation of these modules is described with respect to FIGS. 4 through 9 respectively. A data-responsive module 60 is provided that may compare process data to criteria such as alert threshold values or event profiles. Additionally, the data-responsive module 60 may display values, and may also register imputed values, forecast values and statistics and event profiles. An input metrics circuit 70 is synchronized by a clock circuit 72 to provide inputs to the processing unit 24 comprising signals received from the sensors. The clock circuit 72 also synchronizes provision of output metric values in the module 64 for each, time slice. In traditional applications, a single processing unit 24 may be provided. However, for facilitating processing of data represented by large numbers of input values, e.g., entire video frames at a nominal repetition rate, it is desirable to provide for parallel, pipelined operation utilizing a plurality of processing units 24 as further described with respect to FIG. 10.

Operation of each of the modules 44 through 60 is described further below with respect to FIGS. 4-9. Structure of these modules is described with respect to FIG. 3. It should be noted that the name of each module in FIG. 3 is selected for description in context of the present illustration, and does not constitute a particular limitation with respect to structure or operation. The modules 44 through 60 are connected to provide data or other signals either in series or pipelined to successive stages. Particular connections are controlled by the program module 42. The connections are programmed to provide the operation described in FIGS. 4-9 below.

The modules 44 through 60 each have an input terminal connected to a register 80, 90, 100, 110, 120 and 130 respectively. The registers 80, 90, 100, 110, 120 and 130 each respectively provide an input to logic units 82, 92, 102, 112, 122 and 132 from the logic units 92, 112, 122 and 132 respectively. First through sixth buffers 86, 96, 106, 116, 126 and 136 receive data from the logic units 82, 92, 102, 112, 122, and 132 respectively. Additionally, in the modules 46, 50, 52 and 54, auto adaptive learning memory units 94, 114, 124 and 134 are interactively connected with the logic units 92, 112, 122 and 132 respectively.

Each of the buffers 86 through 136 provides an output to each respective successive module and to the output metrics module 60. The output metrics module 60 includes registers for functions selected by a user. In the present illustration, registers 150, 152, 154, 156, 158 and 160 are provided. These registers may respectively receive alert information based on comparison to a threshold or other signature, displays, even to take values, forecast values, statistics, and events. The events register 160 responds to selected criteria, for example, a preselected degree of deviation of a measured value from an expected value.

Input values and calculated values are provided from the input metrics circuit 70. For example, a side scan sonar receiver may include 512 sensors in a row. A number of spatial dimensions for the side scan sonar row is one. *Dimensions may be spatial or may be indicative of a multiplicity of values associated with each cell.

Calculated values are generated to describe the data. The calculated values are functions of input values selected to reveal information about a collected set of data. In the present illustration, the calculated values include four screener features and four of correlator features per cell is four. Screener and correlators features are functions that are designed to discriminate improbable or out-of-range data input points from background clutter. Screener and correlator features provide measures of deviance between actual and expected feature values. In one form of processing of side scan sonar values, a set of functions has been developed for distinguishing presence or absence of a target and whether the target is a Type 1 target or a Type 2 target. In one form, a Type 1 target is indicated when a first pair of feature deviance values is large, and a Type 2 target is indicated when a second pair of feature deviance values is large. • Both pairs will have a small deviance value in the absence of a target.

Figure 4:
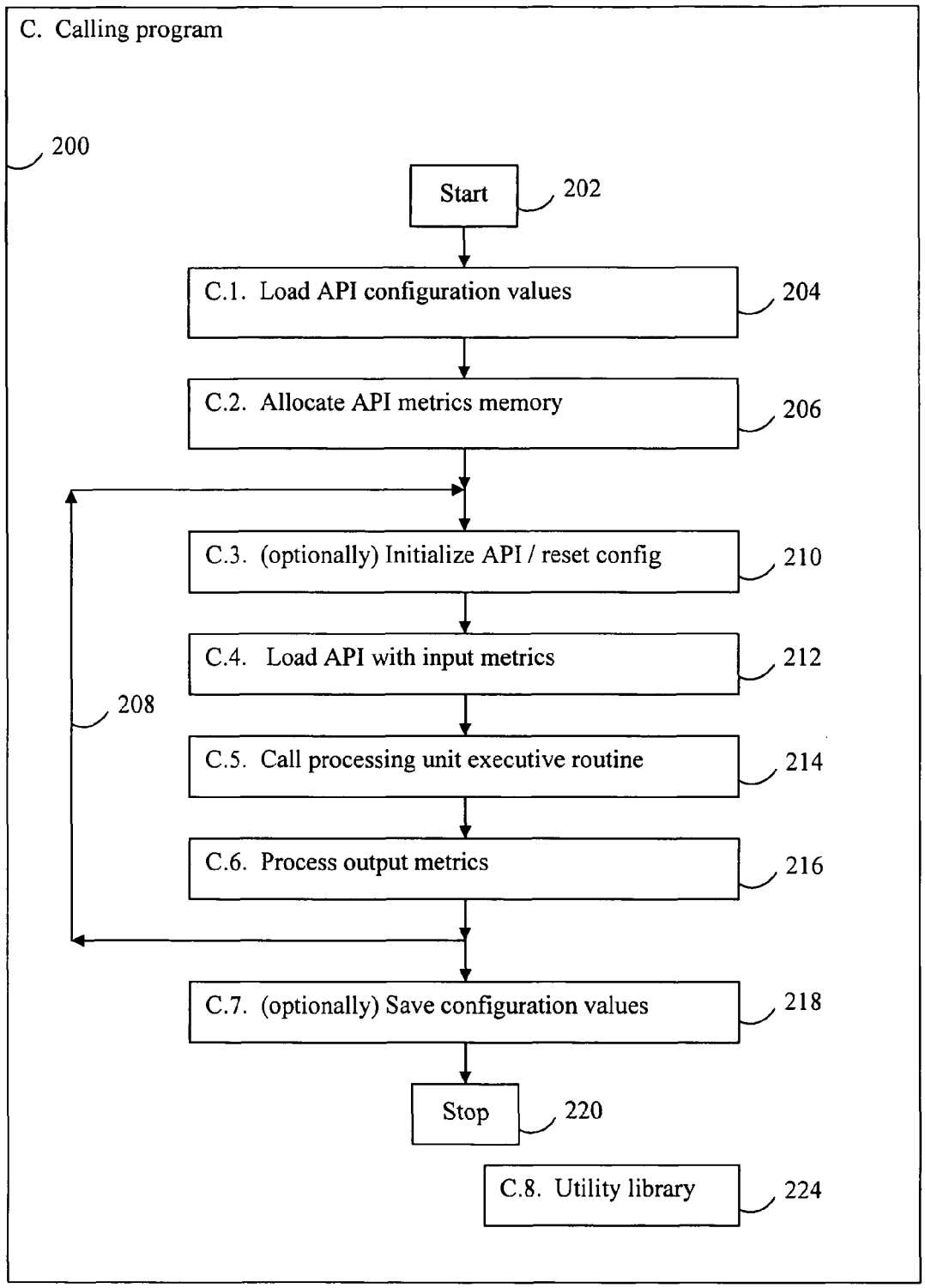
FIGS. 4 through 9 are each a flow diagram illustrating a performance of modular statistical routines within the processing unit.

FIG. 4 is a flowchart illustrating operation of the screener and kernel module 46. While the description of operation may be described from initial startup, the present description assumes that prior time slices have already occurred and that information is already present in the various registers. This is the typical situation. A routine that operates the screener feature module 44 will be referred to as a calling program 200. The calling program 200 starts at block 202, at which configuration programs are loaded. Configuration values include, for example, the number of dimensions, here one, the number of data inputs per* dimension, here 512, and the number of input metric values per data point. Where the input is total sound intensity, the number of input metrics per data point is set at one. Where a data point includes sound intensity at each of three frequencies, the number of input metrics per data point is set at three. Configuration values also include the number of screener features per data point, here set at four and the number of correlator features per data point, here set at four. At block 204, the calling program 200 allocates memory for inputs from the input metrics circuit 70.

At block 206, the program 200 locates memory cells for the API metrics. In the present illustration, allocated API memory would include memory for 512 cell metric values and their 512 corresponding plausibility values. Plausibility value as used in this description is a number between zero and one used by a rapid learning system to control the weight of an input measurement with respect to learning. In one preferred form, the calling program 200 allocates data locations for API 10 values for 512 cells, locations for 512×4 for feature output values and memory for 512×4 correlator output feature values. The program 200 enters into a loop 208 in which updates and calculations may be performed. The loop 208 begins with block 210, and ends with block 216, which may return to the block 210.

The block 210 provides the locally programmable option to modify the above-described API configuration of memory locations. At block 212, input values are loaded into the memory locations dedicated thereto, and the corresponding plausibility values are also loaded. The calling program 200, at block 214, calls the first processor program, further described with respect to FIG. 5 below, which may comprise a set of deviation values between measured and predicted values. Following, at block 216, the system decides whether to return to block 210 to repeat the process or to proceed to a block 218 at which configuration values may be stored, after which at block 220, the routine stops. Criteria that may be employed at block 216 may include whether processing of data produced during each of a preselected number of time slices has been completed. Additionally, a utility library 224 may be accessed. The library 224 includes a broad variety of display and control functions for processing data to be furnished to the output metrics module 60 (FIG. 3).

Figure 5:
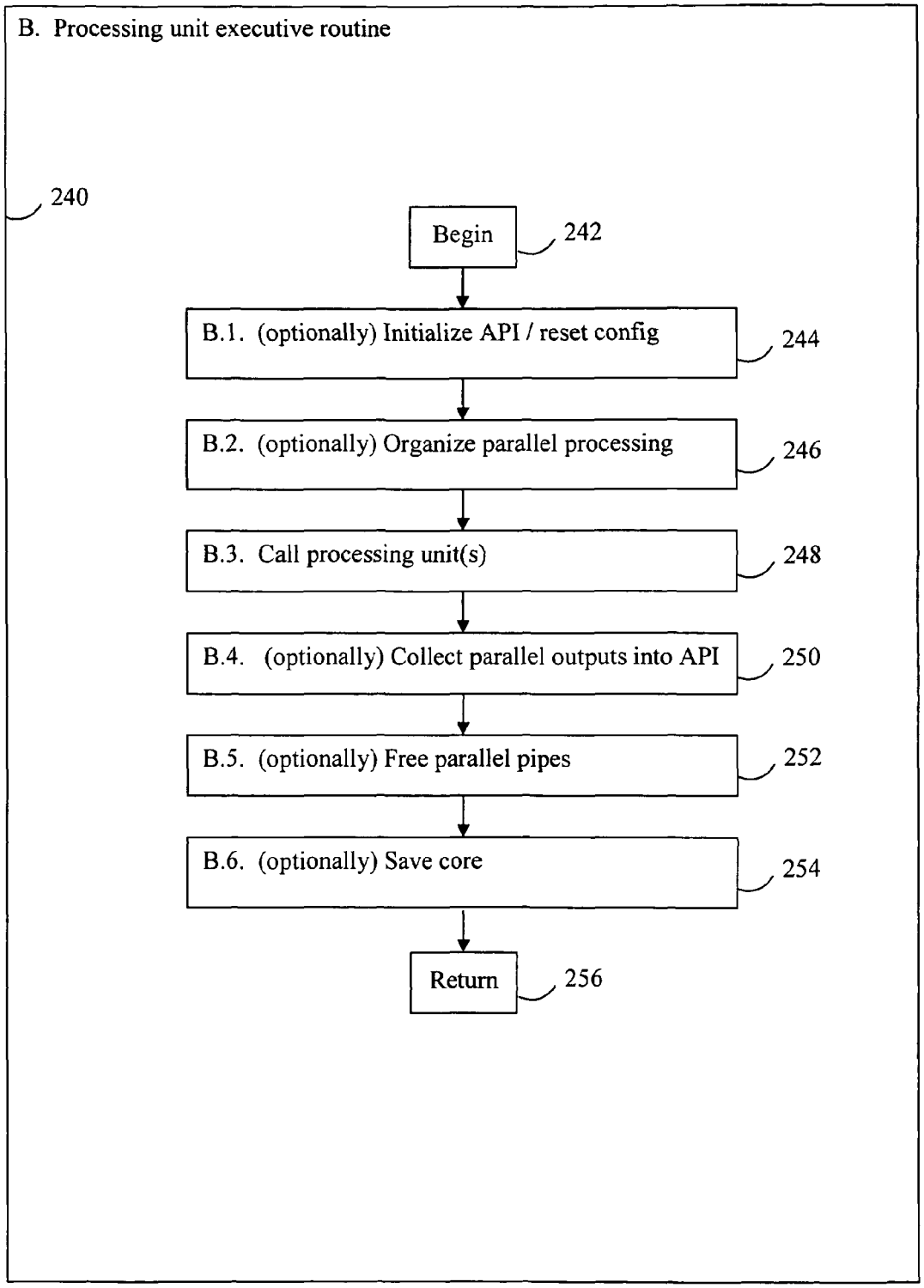

FIG. 5 is a flowchart illustrating programming and operation of the screener kernel module 46. A screener kernel routine 240 begins at the block 242. At block 244, the routine 240 loads the API values accessed by the calling program 200.

At block 246 the values may be organized for parallel processing in embodiments in which parallel processing is utilized. A significant factor in deciding whether to use parallel processing is the rate of arrival of new data and the period of each time slice. In a situation in which new data is arriving every 10 ns, and one processor required 75 ns to process data, then eight processors running in parallel would be needed to process data in real-time. It should be remembered that in the present context, real-time refers to processing without building up a backlog of sensor data. In the current illustration, a line of cells of 512 values is organized. Each parallel processor would process 64 cells. The processor routine would organize parallel processing by distributing sets of 64 input values and 64 plausibility values to corresponding processing modules.

At block 248, the routine 240 at block 254, parallel output metrics are collected. Block 248 represents a subroutine described in further detail with respect to FIG. 6. At block 252, free parallel outputs may be collected. At block 254, auto-adaptive learning memory (ALM) values are saved to a core file. At block 256, processing for a current time slice is completed, and the routine 240 returns to block 242 for processing during a next time slice.

Figure 6:
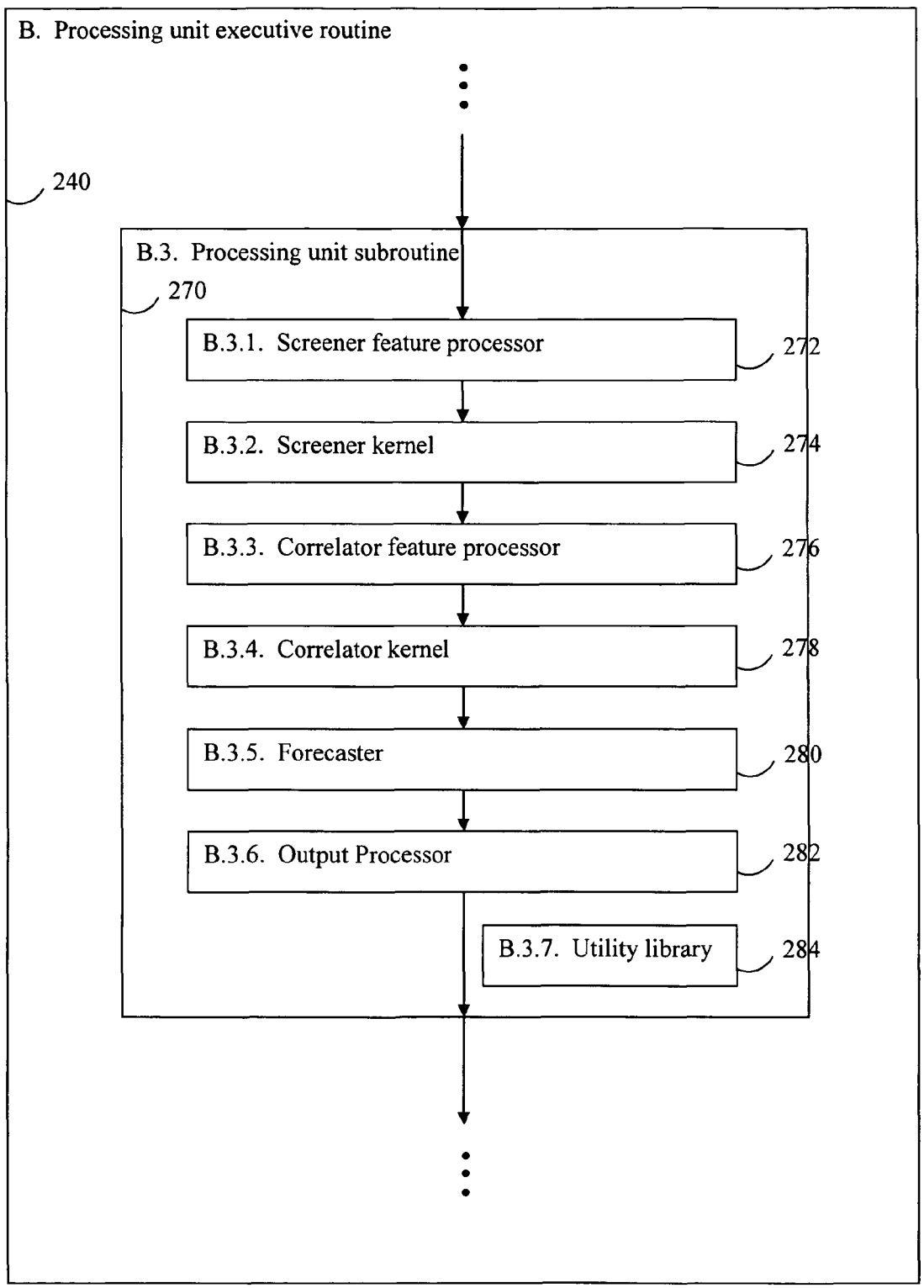

FIG. 6 is a flowchart illustrating programming and operation of a processor subroutine 270 which is called at block 248 in FIG. 5. The subroutine 270 begins with block 272, at which an operation performed in accordance with embodiments of the present invention and described in the present context as a window function is called. The window function is described in greater detail with respect to illustrations beginning with respect to FIG. 13 below. The windowing feature selects data from nearest data locations in time and space for calculation of values. At block 274, the screener kernel, further described with respect to FIG. 7 below is called. At block 278, the correlator kernel, described with respect to FIG. 8 is called. At block 280 the forecaster function may be called and at block 282, a range of output values for a current time slice is tabulated. The subroutine 272 utilizes a utility library 284.

When the screener kernel 274 is called, each feature input value for a given time slice is transformed into a deviance value. The deviance value comprises an input for the correlator feature processor at block 276. When the correlator kernel 278 is called, the correlator kernel 278 utilizes the window function to impute each current value as a function of a configurable number of nearest neighbor of values in time and space. This is explained in further detail beginning at the FIG. 13 below. At block 278, a correlation matrix is provided to the forecaster.

The forecaster 280, when utilized, produces a forecast for each feature and each time slice, including any configurable number of future time slice forecasts. The forecaster 280 may utilize prior art forecasting functions. While the forecasting functions are known, the forecasting output values are utilized in accordance with embodiments of the present invention to improve event recognition, including a values, deviance detection and deviance correction. Established correlational systems cannot distinguish underlining deviant values from apparent deviant values that are not in fact deviant. The present method can uniquely discount such apparently deviant values by using previously generated forecasts and to identify those apparently deviant values that are close to their forecast values, and therefore most likely are not deviant. The output processor 282 received deviance values from the screener kernel 274 in the correlator kernel 276 along with all ports from the forecaster 284 utilization in accordance with embodiments of the present convention as further described below.

Figure 7:
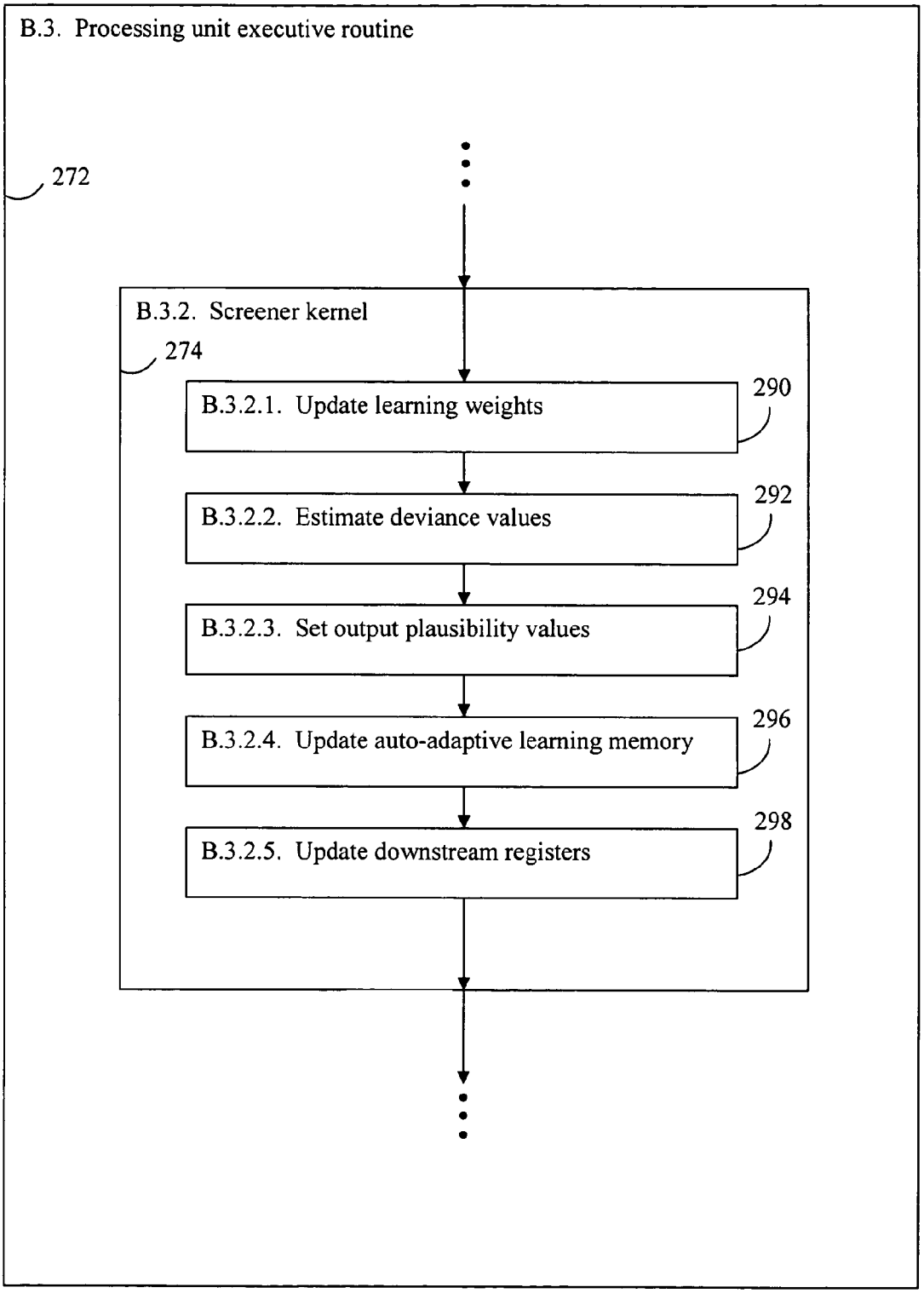
Figure 8:
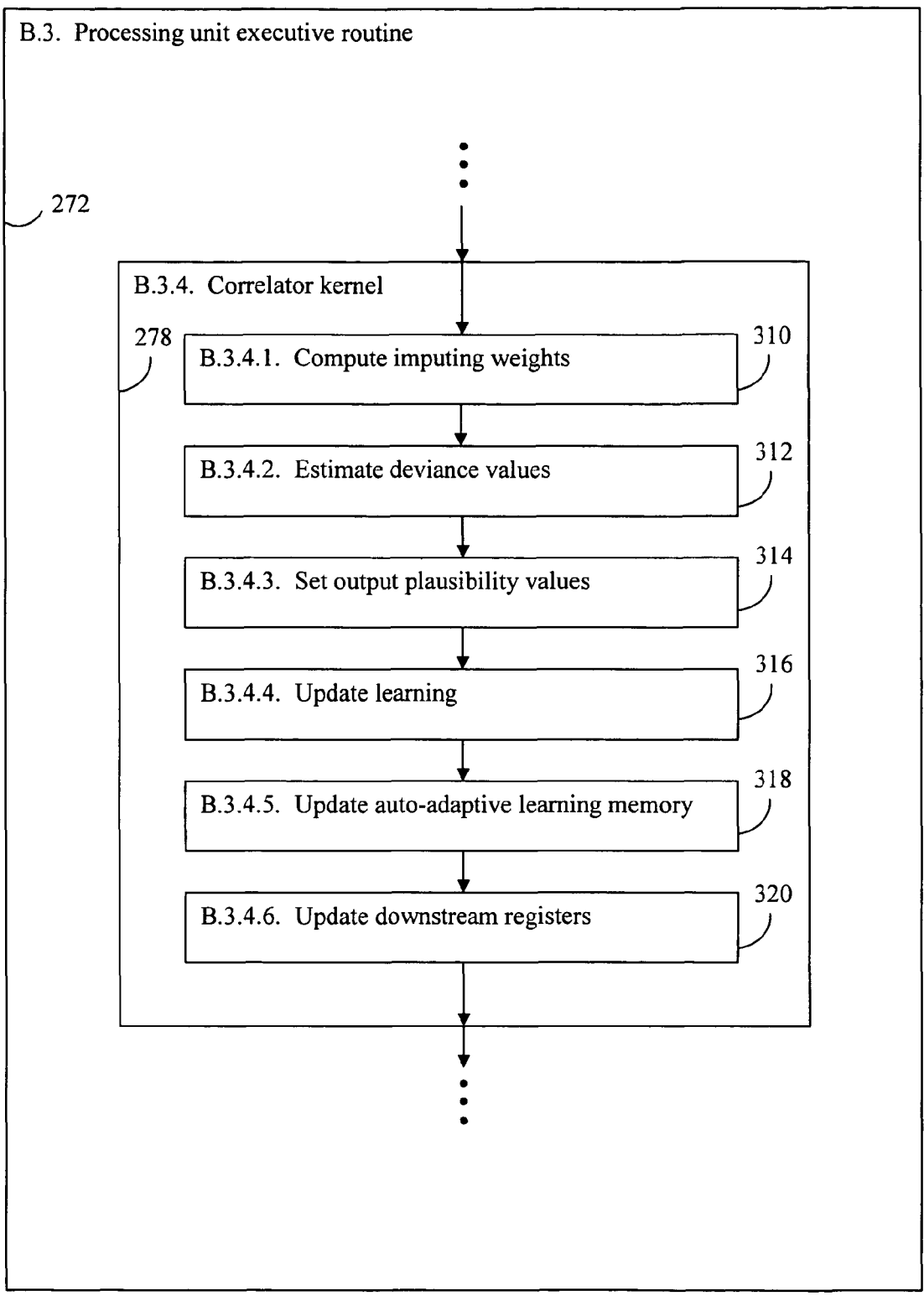

FIG. 7 is a flowchart illustrating the operation in programming of the screener kernel 274. At block 290, learning weights are updated. At block 292, deviance value estimation is performed, and an ALM updating is performed. At block 294, in accordance with embodiments of the present convention, the screener kernel 274 provides output plausibility values for use in identifying deviant events. At block 298, downstream registers are updated. The functions at blocks 290 through 298 are separable and may be performed in parallel.

FIG. 8 is a flowchart illustrating the operation and programming of the correlator kernel 278. At block 310, imputing weights are calculated based on most recently updated correlator learned parameters. At block 312, deviance values are estimated by use of the correlator kernel 270. At block 314, output plausibility values are set utilizing the correlator kernel 278. At block 318, the ALM values are updated, and at block 320, downstream registers are updated.

Figure 9:
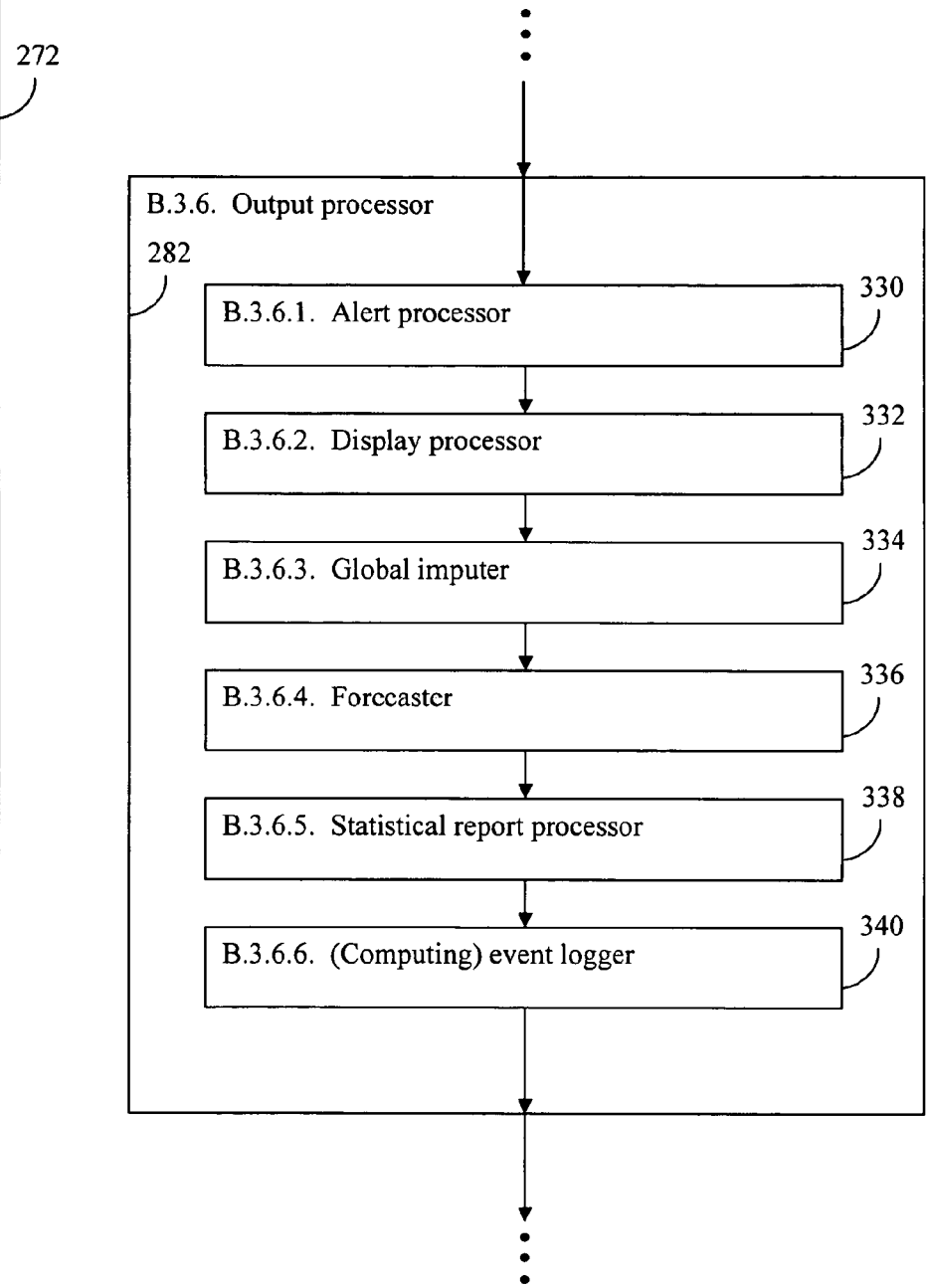

FIG. 9 is a flow chart illustrating the operation and programming of the output processor 282. At each time slice, the output processor routine 282 calls an overt processor routine 330 which provides values to the alert module 150. The alert processor module 330 utilizes deviance and plausibility values provided to it from the screener kernel module 46 and the correlator kernel 50. The alert processor routine 330 employs an easily programmable window function. The window function selects an estimation set, described with respect to FIGS. 13-17 below, for processing. The display processor routine 332 operates in a similar matter to produce outputs for graphical display. A global imputer routine 334 operates similarly to the alert processor routine 330 to produce imputed metrics. The imputer routine 334 utilizes plausibility values based on previously obtained input metrics from the data gathering routine 210 (FIG. 4). A forecaster routine 336 produces excessive outputs. A statistical report processor 45 and the event longer routine 340 produced current results and overwrite prior results.

Figure 10:
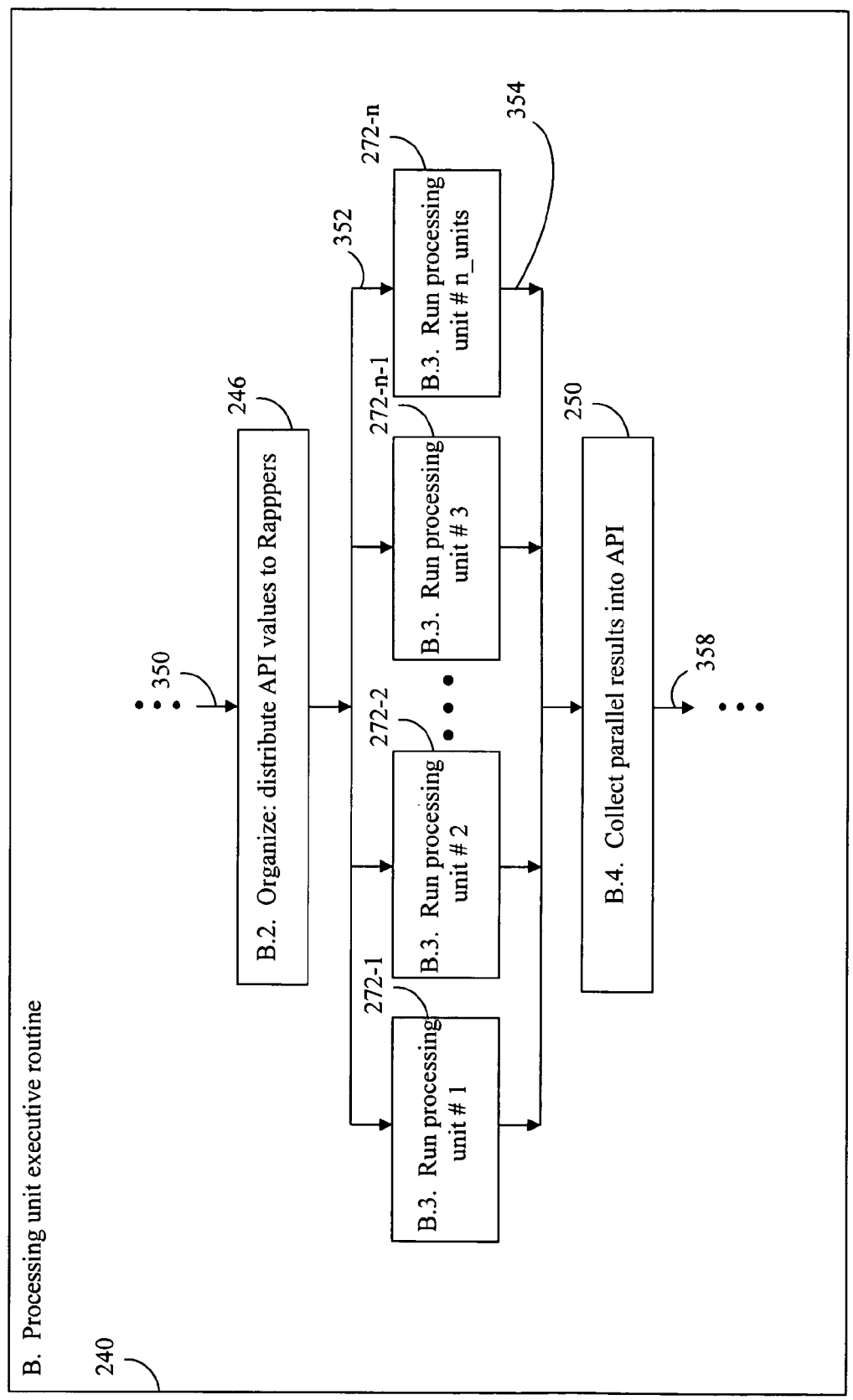
FIG. 10 is a flowchart illustrating parallel processing of generated values.

FIG. 10 is a flowchart illustrating parallel operation of the processor module of FIG. 5. During each time slice, the processor routine 240 provides the parallel processing module 246 (FIG. 5) with API values 350. At block 352, the parallel organizer 246 provides API input values including configuration parameters and input measured values along with auto-adaptive learning memory values. In block 352, values are distributed to separate processing modules. For example, the first 64 input values and their corresponding plausibility values would be supplied to module 272-1. Successive groups of 64 output values and corresponding plausibility values would be supplied to modules 272-2 through 272-n. In this manner, output values for an entire line are collected and at step 354 are combined and provided as collected parallel outputs and for the API at block 250. The parallel collected output processor output values 250 are received at an output 358 (FIG. 5). Consequently, operation of the circuitry of FIG. 3 is enabled.

Referring again to FIG. 3, operation of the processor 40 is described. Output signals produced during each of the number of time slices are used during a current time slice, which will be referred to as t0. The outputs being utilized during time t0 are illustrated in FIG. 11, which is a chart illustrating the signals used by each of the modules 44-60 during the time slice t0. The processor 40 receives the values collected during step 352 (FIG. 10). When the input measured time slices arrive sufficiently slowly so that the processor 40 can keep up with successive inputs, the modules 44-60 could operate sequentially. Alternatively, the processor 40 could sense a higher data input rate as follows. At the beginning of a time slice t0, the screener feature module 44 would convert input metrics 352 (FIG. 10) for the time slice t0 into outputs of the screener feature module 44 when it sends the values into the buffer 86 for later downstream processing. Meanwhile, the screener kernel module 46 has transformed feature values from time slice t-1 based on the input metrics received in time slice t-1 into deviance values and placed the values into buffer 96 for later downstream processing.

The correlator feature module 48 provides outputs to the buffer 106. Similarly, the correlator control module 50 provides calculated outputs based on deviance values previously computed by the screener kernel module 46 at time slice t-1 and based on input metrics received in time slice t-3 into deviance values to the buffer 116. Meanwhile, the forecaster module 52 would use output values that were previously updated by the correlator kernel module 50 at time slice t-1. Based on input metrics received at time slice t-4, forecast values for time slice t-3 were produced. Optionally, additional values may be produced utilizing more time slices into the future relative to time slice t-4 and placed into the forecaster module buffer 126. Concurrently, the output module 54 would 'transform input values received from time slice t-5 along with output deviants and plausibility values from the screener kernel module 46 corresponding to input values received from the time slice t-5 that were completed during time slice t-4. Further, the correlator kernel output 50 input receives deviance and plausibility values corresponding to input values received at time slice t-5 that were computed during time slice t-2, and provides various output values and stores them in register 136, the future updating output metrics 358 (FIG. 10), alerts 150, displays 152, imputed values 154 and the statistics registers 158.

Figure 12:
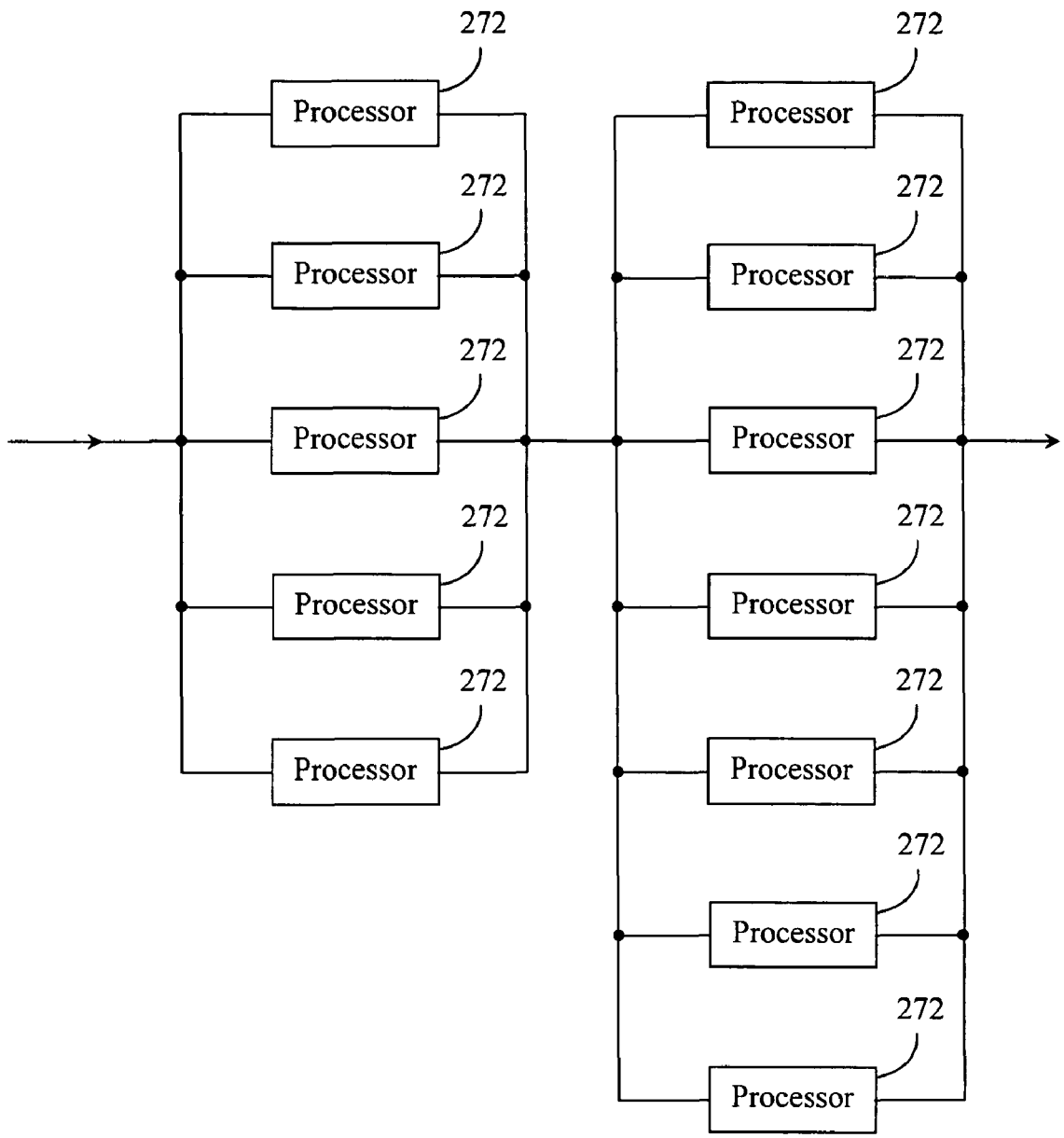
FIG. 12 is a block diagram of a parallel processor performing the routines of FIG. 10.

FIG. 12 is an illustration of a parallel, pipelined configuration for the processor 40. A group of processors 272 may be connected in parallel. Further, a plurality of such groups may be connected in series to comprise a pipeline. Daisy wheel registers, each of which can be quickly updated at the end of each time slice, may be used to embody the registers 80, 90, 100, 110, 120 and 130 (FIG. 3) when used in conjunction with buffered pipelining. By providing for parallel processing, output metrics may be produced just as quickly with one set of register hardware as with the alternative of having six distinct sets of register hardware operating in a sequential fashion. One sixth of the hardware also requires ⅙ of the logic code to be programmed.

FIGS. 13 through 17 are each a chart useful in understanding processing data sets having various numbers of temporal and spatial dimensions. Embodiments of the present invention utilize a form of "nearest neighbor" processing in order to impute expected values for particular cells. As further explained below, the processor 40 utilizes a Markov chain. A Markov chain embodies a model of sequences of events where the probability of an event occurring depends upon the fact that a preceding event occurred. In prediction and simulation, the principle of the Markov chain is applied to the selection of samples from a probability density function to be applied to the model. The "windowing" function described above refers to the selection of adjacent cells within selected dimensions to be processed together. By utilizing the Markov chain, reliable estimations may be made for imputed values, and the complexity, expense and time required to generate an inverse of a covariant matrix may be avoided.

In each of the illustrations of FIGS. 13-17, a hypothetical situation is selected in which the sets of data describing different sorts of environments are defined. In each illustration, the environment is characterized by a number of temporal and spatial dimensions. In each case, an imputed value calculated during a current time period t0 will be described as a dependent value indicated by space D. The dependent value D is calculated as a function of independent values, indicated in each matrix location as I. The independent values I are values that are taken as having been established with respect to the cell currently being computed. Generally the independent values I will have been established for either successive time periods or successive locations. Another class of independent values I is referred to as F. These values are "frame" values. They are described separately since they are in cells which do not have an adjacent location on at least one side of the cell. In each of the illustrations below, the dependent value is calculated in terms of values obtained from two prior time slices, labeled t-2 and t-1, which are the two successive time slices preceding time t0. In each case, values are entered in a matrix wherein rows correspond to time slices t-2, t-1 and t0 respectively.

Each column corresponds to a location. For example, in FIG. 13, eight locations, labeled 0 through 7 are provided. In the illustrations of FIGS. 14-17, sixteen spatial locations are provided. The outer locations are labeled F and F, respectively corresponding to left and right frame cells respectively. In practice, the outer locations could be at left and right horizontal ends of a space. However, left and right are used here only to denote first and last locations. Other spatial relationships or non-spatial relationships could be represented. The locations between the outer frames F and F are labeled 0 through 13. In one form, frame values may be set to zero. Providing frame values allows the windowing function to select the number of "nearest neighbors" in each estimation set even when a value does not have a nearest neighbor.

In operation of embodiments of the present invention, a "windowing" function selects an appropriate set of I values from a data array to comprise a correlation matrix used to impute a D value. This set is a function of the estimation algorithm. The data array referred to here is data responded to by a system. In one preferred form, the data array is a record organized by sensors producing outputs for data points, attributes per data point and time slices. Attributes per data point may include values for each of the different features, values in each of a plurality of dimensions or other known forms of measurement. For purposes of the present description, this set is called an estimation set. As further described below, the members of an estimation set are a function of the number of attributes of a data point and the number of time slices utilized.

In one preferred form, the estimation set comprises a set of nearest neighbor values in each of N dimensions, where N is a non-negative integer. Dimensions may be spatial or temporal. More than three spatial dimensions or one temporal dimension may be utilized to characterize a data point. Indeed, in some cosmological models, there may be dozens of spatial dimensions. Where a value is measured over time, M sets of values, one from each of M successive time slots, are utilized. Commonly, M is selected to be three, representing the time slots t-2, t-1 and t. Other values may be selected. However, M=3 has been found to be a useful optimization of complexity of processing versus precision of result. Additionally, in accordance with embodiments of a preferred form of the present invention, it has been found that it may be assumed that correlations for sets including F and F may be used in the same manner as sets in the center of a data array.

FIG. 13 is representative of measurement of a value versus time but without spatial dimensions. There are eight features describing a given cell. Here, a cell is a row of data. The parameter indicated by the data in each • location comprises a value that is not related to an adjacent value. In this case, in each of the columns 0 through 7, the current value at time t0 is a function of the two preceding values respectively at times t-2 and t-1 respectively.

FIG. 14 represents data for a situation in which one spatial dimension is measured with respect to time. FIG. 4 may be used to represent the above-described side scan sonar application. A "window" comprising data from the three time periods of interest and the independent values surrounding a current location to be computed is selected. The window has a number of columns and rows that correspond to the estimation set. In the present illustration, each "window" will comprise the estimation set. The window will be indexed across the data matrix one step at a time so that current estimation sets are accessed and imputed values D can be calculated. The first window will include locations to F, 0 and 1. In FIG. 14, these are indicated by light shading. Successive "windows," or estimation sets, such as 0-1-2, 2-3-4; etc. will be selected in sequence. In FIG. 14, a middle window cell comprising locations 5-6-7 is illustrated. Indexing proceeds through the end of the dimension up to the last window cells, which in the present illustration are cells 12, 13 and F.

FIG. 15 illustrates a tabulation of data obtained for parameters in one spatial dimension at a given time. The rows represent space slices rather than time slices, and the columns indicate locations within each dimension. The dependent value to be imputed is calculated in terms of the preselected number of surrounding locations. In the present illustration, the estimation set consists of eight surrounding locations. These locations are the surrounding columns indicative of locations, and the two preceding rows indicative of measurements in successive dimensions.

Figure 16:
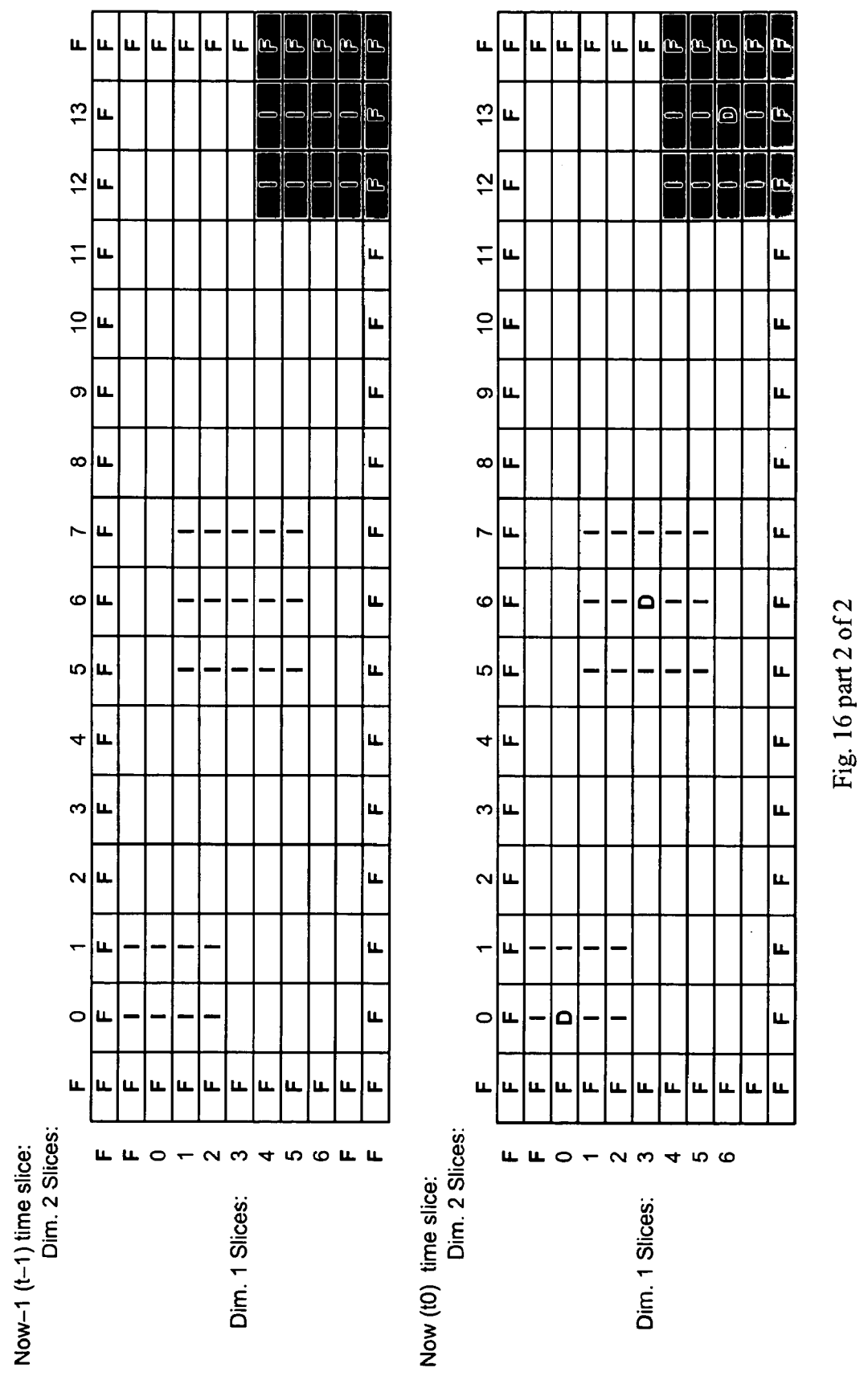

FIG. 16 consists of FIGS. 16*a*, 16*b* and 16*c*. The parameters measured in this illustration include one feature per cell. Each parameter is time variant and has two spatial dimensions. The estimation set includes values in two preceding time slices and in surrounding locations represented by adjacent columns. Additionally, as in FIG. 15, values and surrounding dimensions are used to calculate the imputed value. FIGS. 16*a*, 16*b* and 16*c* respectively represent data matrices for time slices t-2, t-1 and tO respectively. Each independent value submatrix comprises 15 boxes. The dependent value D needs to be located between both preceding and succeeding dimensional rows.

Figure 17:
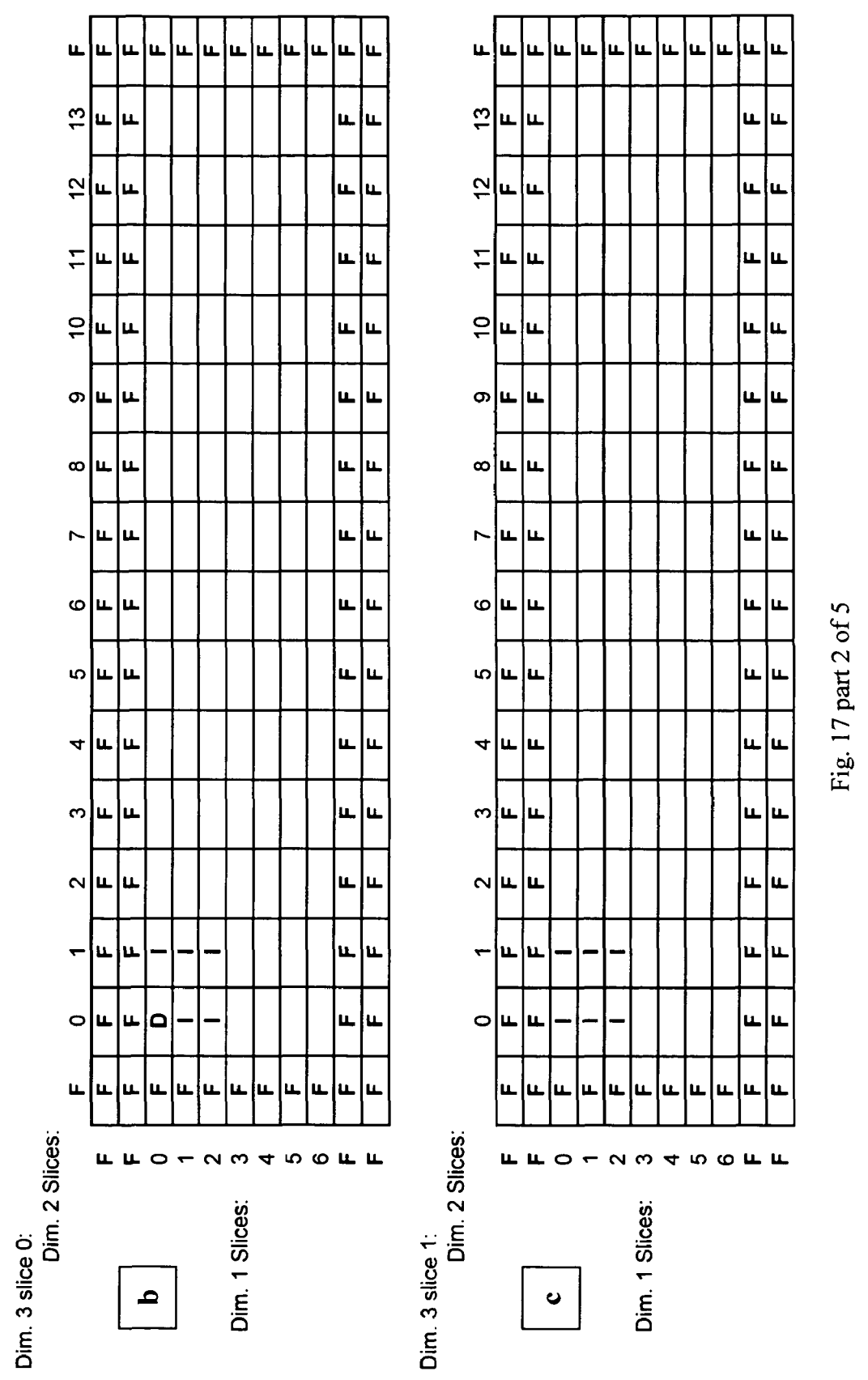
Figure 17:
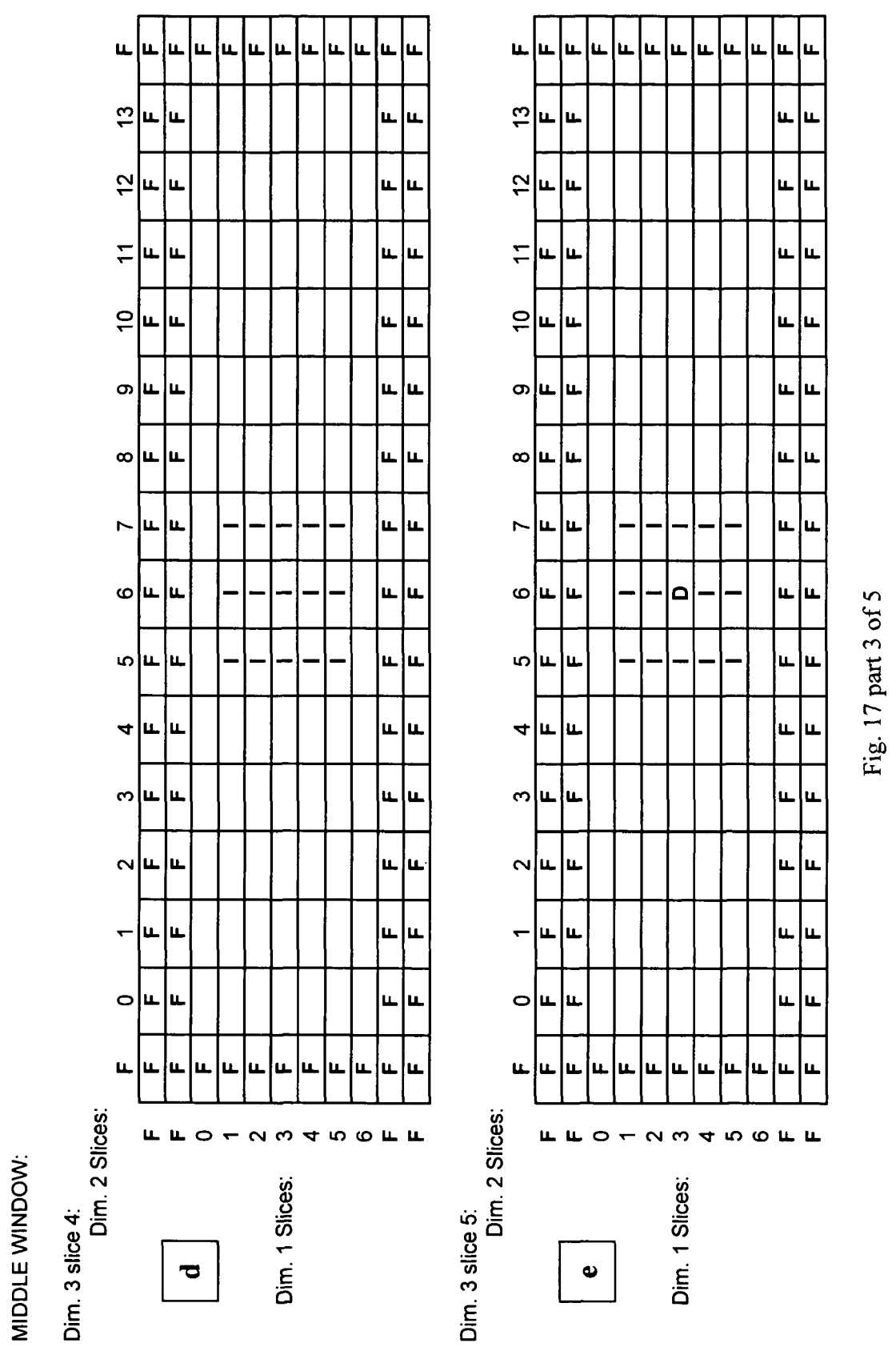
Figure 17:
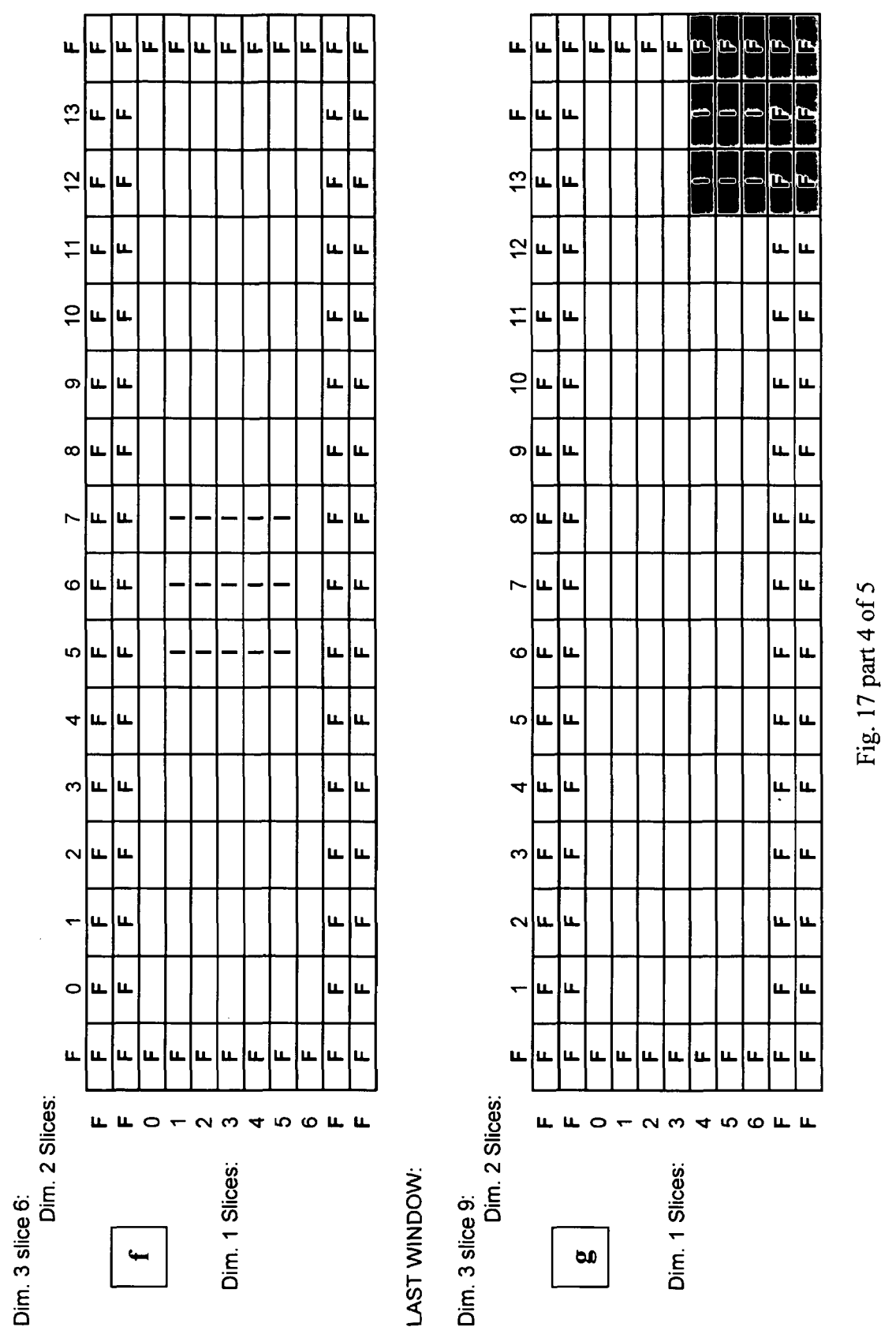
Figure 17:
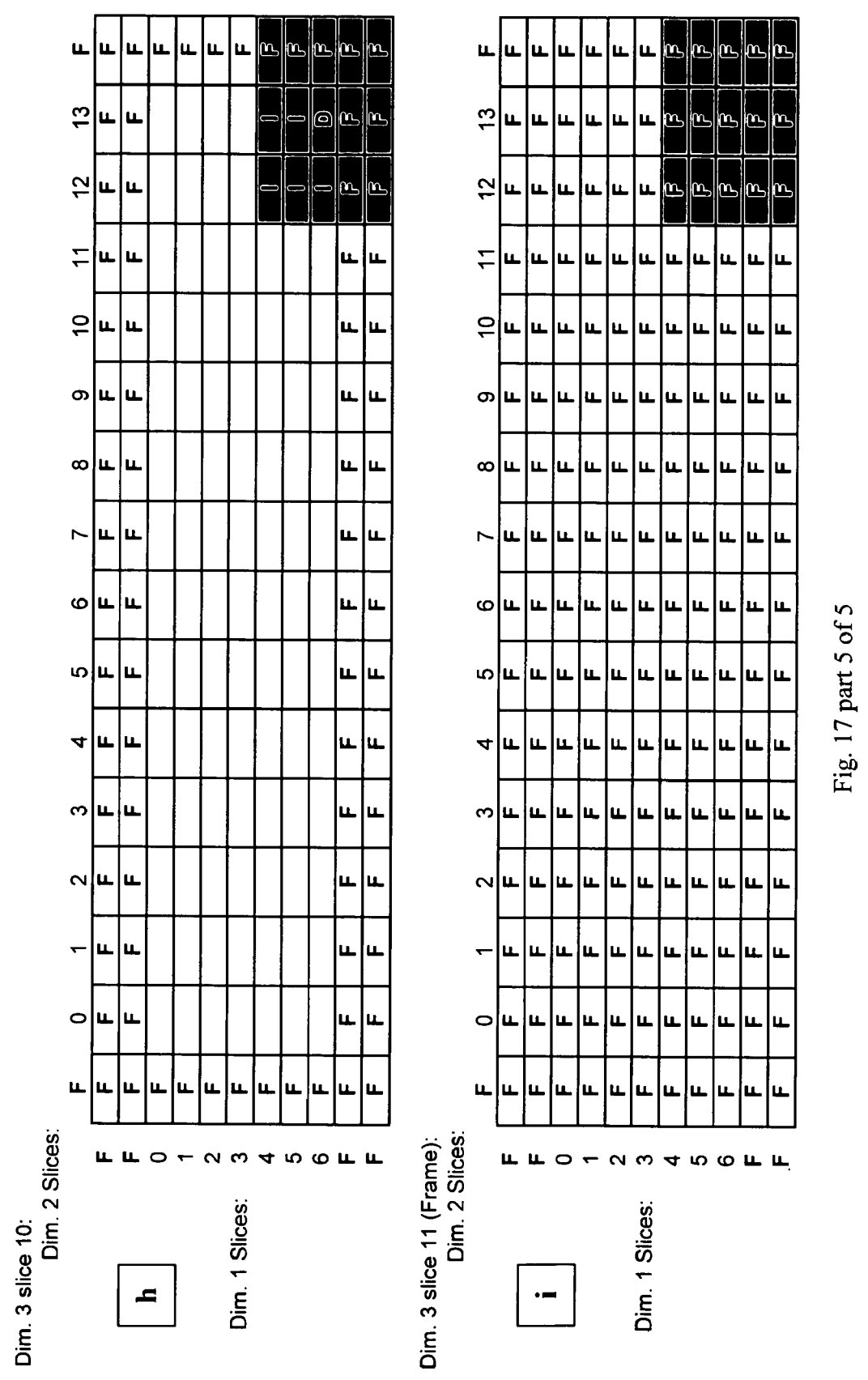

FIG. 17 consists of FIGS. 17*a*-17*i*. In this illustration, there is one feature per cell having three spatial dimensions. Three window slices representing values produced during time slices t-2, t-1 and t0 respectively. Values for a third dimension are based on measurements in two other dimensions. FIGS. 17*a*, 17*b* and 17*c* respectively represent initial values at the locations F, zero and 1. In these matrices, a full set of surrounding locations is not available. Full value matrices are illustrated in FIGS. 17*d* through 17*i*. An illustrative calculation is illustrated with respect to FIGS. 17*d*, 17*e* and 17*f*. As in the case of FIG. 16, rows surrounding the dependent value D must be included in the value matrix. Additionally, the matrices surrounding the dependent value in the third dimension must also be included. Imputed values may thus be calculated for the point in a three-dimensional space.

Figure 18:
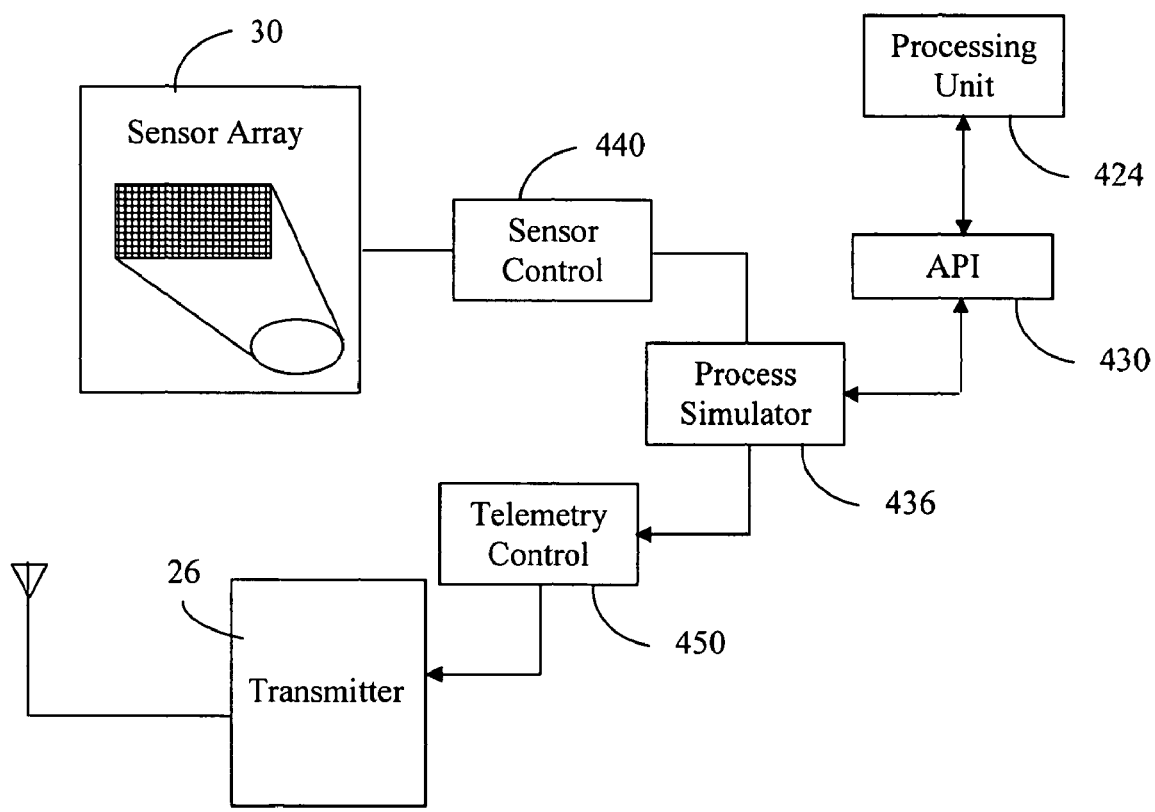
FIG. 18 is a block diagram of a processing unit interacting with an application program interface and sensors.

FIG. 18 is a block diagram of a processing unit interacting with an application program interface and sensors. FIG. 18 is a block diagram similar to FIG. 2 illustrating and electronics package 20 and sensor 30 interacting with a processing package 424. The processing package 424 has input data and output data coupled via an API 430 to a process simulator 436. A sensor control unit 440 may be coupled between the process simulator 436 and the sensor 30. The sensor control circuit 440 may adjust values for black-and-white levels, contrast and filtering functions. Additionally, a telemetry control circuit 450 may be coupled between the process simulator 436 and the transmitter 26. In one embodiment, the telemetry control 450 responds to the output matrix unit (FIG. 3) to transmit or reject selected output data.

Figure 19:
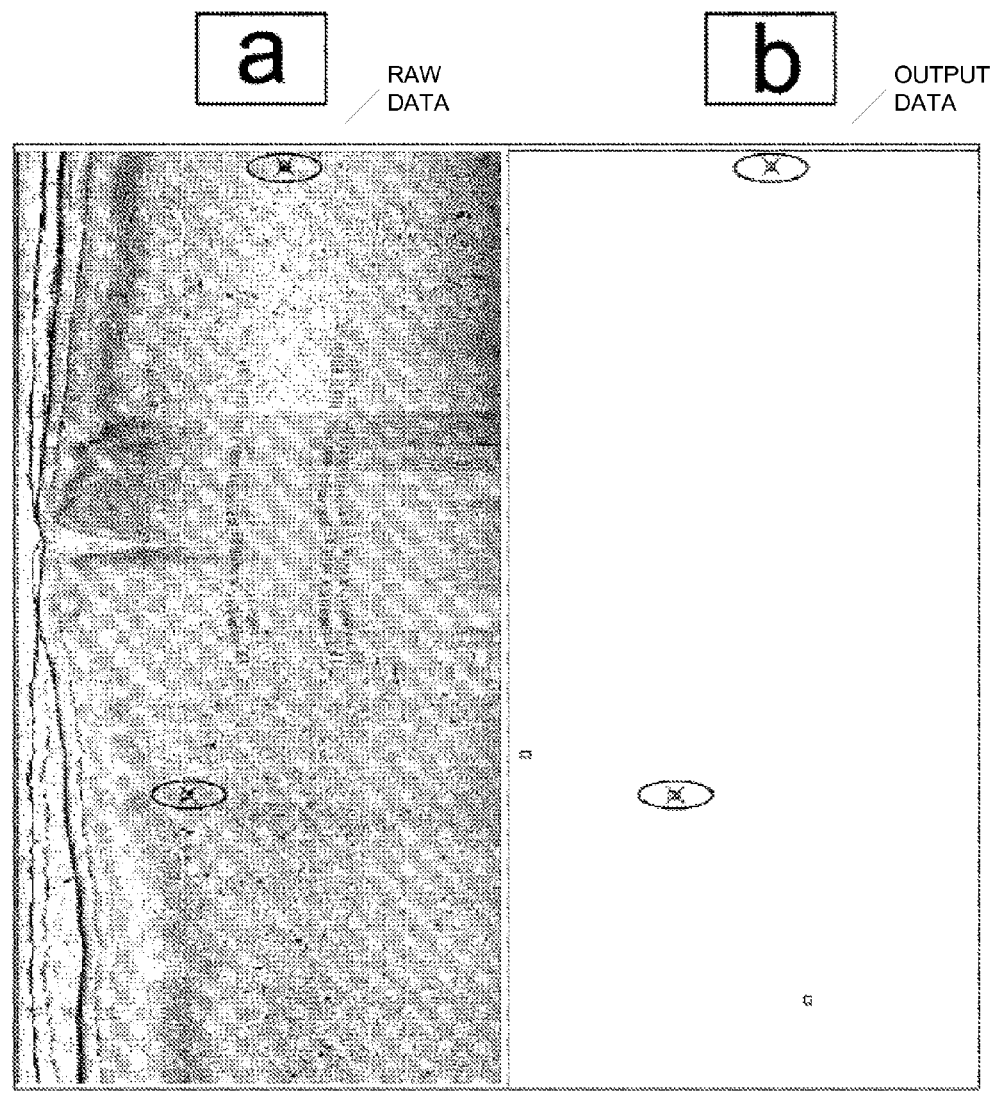
FIG. 19, consisting of FIG. 19a and FIG. 19b represents a nominal set of input information from a video camera and processed data from which clutter has been removed.

FIG. 19, consisting of FIG. 19a and FIG. 19b represents a nominal set of input information from a video camera and processed data from which clutter has been removed. FIG. 19a represents a nominal display of raw data illustrating amplitude versus wavelength of detecting-video signals on an arbitrary scale. FIG. 19b represents output data as processed by the processing unit 424. Commonly, the processing routines performed by the processing unit 424 reject meaningless returns and provide out put information with minimal or no "false positive" output signals.

Figure 20:
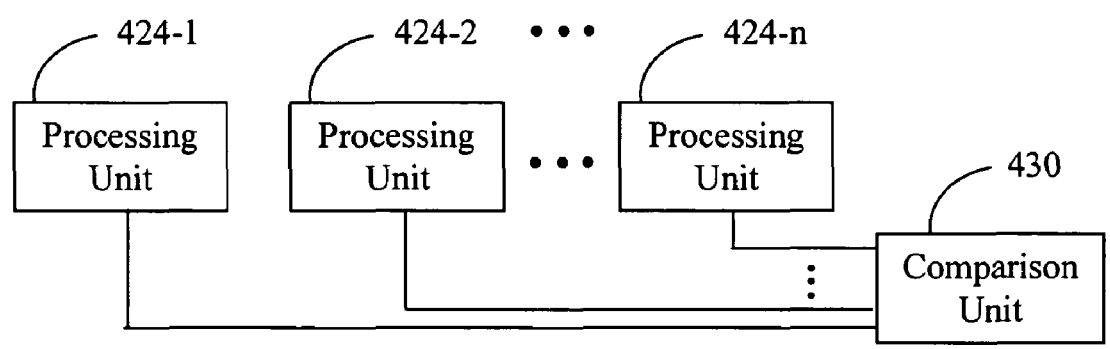
FIG. 20 is a block diagram illustrating a system utilizing a plurality of processing units, each having a different configuration.

FIG. 20 is a block diagram illustrating a system utilizing a plurality of processing units 524, 524-1, 524-2, 524-n. Each processing unit 524 is configured differently so that efficacy of various settings may be compared. Each processing unit 524 may perform the same function, but with different settings. Periodically, for example, weekly, a comparison circuit 540 measures the relative success of each processing unit 524 in terms of a preselected criterion. For example, the preselected criterion may be smallest mean squared the deviation between actual and imputed values during the monitoring time. The most successful group of settings may be selected for processing data during a next time period. This operation may be described as convergent data fusion in that convergence of actual and imputed values may be minimized.

The present embodiments provide for separate parallel operation of calculation models. Consequently, adaptive processing may be utilized for tasks that were previously considered to be intractable in real time on hardware of the type used in low powered, portable processors. The option of modular pipelined operation simplifies programming; design and packaging, and allows for use of FPGAs in place of high-powered processors. Learned parameter usage, based on assuming that the same estimation functions and learned parameter values can be used to produce the estimates that in turn, allow unexpected events to be detected more simply. Field programmable windowed functionality can be applied to many applications by programming the data matrix to be selected by a "windowing" function. Auto-adaptive learning memory may be distributed over pipelined processing modules. The present subject matter being thus described, it will be apparent that the same may be modified or varied in many ways. Such modifications and variations are not to be regarded as a departure from the spirit and scope of the present subject matter, and all such modifications are intended to be included within the scope of the following claims.

What is claimed is:

1. A computer implemented method for processing an array of data collected through a sensor array over successive time slices with a plurality of data points being provided during each time slice, comprising:
   defining a current estimation set for a dependent data location for which a value will be imputed, said estimation set comprising the dependent data location and a preselected number of nearest neighbor values surrounding the dependent data location in a current time slice;
   accessing estimation sets from each of a preselected number of time slices corresponding to said current estimation set; and
   imputing a value to the dependent data location in at least one dimension among space, time, and feature dimensions in accordance with an estimation function; and
   evaluating usability of said array of data collected through said sensor array; and
   determining whether or not to transmit said array of data based on said evaluation.

2. The method of claim 1, wherein evaluating usability comprises determining a difference between imputed values of dependent data locations and measured values of corresponding data points.

3. The method of claim 2, further comprising transmitting only data for which differences exceeding a preselected level have been determined.

4. A system for performing an auto-adaptive function comprising:
   a processing unit having a memory configured to organize input data for a plurality of data points for successive time slices, the processor configured to select a current estimation set in at least one dimension for a dependent data location for which a value, which is at least one dimension among space, time, and feature dimensions, will be imputed, said estimation set comprising the dependent data location and a preselected number of nearest neighbor values surrounding the dependent data location in a current time slice;
   an arithmetic unit configured to be executed by said processing unit, said arithmetic unit configured to impute a value, which is at least one dimension among space, time, and feature dimensions, to each dependent data location in accordance with an estimation function; and
   an output module configured to be executed by said processing unit, said output module configured to evaluate usability of said input data and determine whether or not to transmit said input data based on said evaluation.

5. The system of claim 4, wherein the arithmetic unit is further configured to determine a difference between imputed values of dependent data locations and measured values of corresponding data points.

6. The system of claim 5, wherein the output module is further configured to transmit only the input data for which differences exceeding a preselected level have been determined.

7. A computer readable medium having stored thereon one or more sequences of instructions for causing one or more processing units to perform the steps for processing an array of data collected over successive time slices with a plurality of data points being provided during each time slice, the steps comprising:
   defining a current estimation set for a dependent data location for which a value will be imputed, said estimation set comprising the dependent data location and a preselected number of nearest neighbor values surrounding the dependent data location in a current time slice;
   accessing estimation sets from each of a preselected number of time slices corresponding to said current estimation set; and
   imputing a value to the dependent data location in at least one dimension among space, time, and feature dimensions in accordance with an estimation function; and
   evaluating usability of said array of data; and
   determining whether or not to transmit said array of data based on said evaluation.

8. The computer readable medium of claim 7, wherein the evaluating usability step further comprises determining a difference between imputed values of dependent data locations and measured values of corresponding data points.

9. The computer readable medium of claim 8, further comprising the step of transmitting only data for which differences exceeding a preselected level have been determined.

* * * * *